(12) United States Patent
Tenmyo et al.

(10) Patent No.: US 9,366,943 B2
(45) Date of Patent: Jun. 14, 2016

(54) IMAGE CAPTURING ILLUMINATION APPARATUS

(71) Applicant: CANON KABUSHIKI KAISHA, Tokyo (JP)

(72) Inventors: Yoshiharu Tenmyo, Tokyo (JP); Toshiki Miyakawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 14/157,905

(22) Filed: Jan. 17, 2014

(65) Prior Publication Data

US 2014/0211446 A1 Jul. 31, 2014

(30) Foreign Application Priority Data

Jan. 25, 2013 (JP) ................. 2013-012044

(51) Int. Cl.
*G03B 15/05* (2006.01)
(52) U.S. Cl.
CPC ........ *G03B 15/05* (2013.01); *G03B 2215/0575* (2013.01); *G03B 2215/0578* (2013.01); *G03B 2215/0582* (2013.01); *G03B 2215/0592* (2013.01)
(58) Field of Classification Search
CPC .... G03B 15/02; G03B 15/03; G03B 15/0442; G03B 15/05; F21V 7/0025
See application file for complete search history.

(56) References Cited

U.S. PATENT DOCUMENTS

| | | | |
|---|---|---|---|
| 5,345,284 A * | 9/1994 | Tsuruta | G03B 15/05 396/190 |
| 5,897,201 A | 4/1999 | Simon | |
| 5,926,658 A | 7/1999 | Tenmyo | |
| 6,078,752 A | 6/2000 | Tenmyo | |
| 6,400,905 B1 | 6/2002 | Tenmyo | |
| 6,807,369 B1 | 10/2004 | Tenmyo | |
| 7,254,323 B2 | 8/2007 | Tenmyo | |
| 7,486,885 B2 | 2/2009 | Tenmyo | |
| 8,314,882 B2 | 11/2012 | Takano | |
| 2009/0115880 A1 | 5/2009 | Wada et al. | |
| 2009/0128688 A1 | 5/2009 | Takano | |
| 2010/0315816 A1 * | 12/2010 | Madelin | G03B 15/06 362/294 |
| 2014/0209796 A1 * | 7/2014 | Ishii | G03B 15/05 250/227.11 |
| 2014/0211446 A1 * | 7/2014 | Tenmyo | G03B 15/05 362/11 |

FOREIGN PATENT DOCUMENTS

| | | |
|---|---|---|
| CN | 101435973 A | 5/2009 |
| CN | 101982967 A | 3/2011 |
| JP | 2001-215574 A | 8/2001 |
| JP | 2012-220818 A | 11/2012 |

OTHER PUBLICATIONS

Mar. 29, 2016 Chinese Official Action in Chinese Patent Appln. No. 201410032761.5.

* cited by examiner

*Primary Examiner* — W B Perkey
(74) *Attorney, Agent, or Firm* — Fitzpatrick, Cella, Harper & Scinto

(57) ABSTRACT

The illumination apparatus includes a light source, a first reflective portion provided inside further than the light source in a radial direction so as to extend in a circumferential direction and reflecting light from the light source toward a light projecting direction. The apparatus further includes a second reflective portion provided inside further than the light source in the radial direction so as to extend in the radial direction and reflecting the light from the light source toward an area extending to a side away from the light source in the circumferential direction.

19 Claims, 17 Drawing Sheets

IMAGE CAPTURING ILLUMINATION APPARATUS

BACKGROUND OF THE INVENTION

1. Field of the Invention

The present invention relates to an illumination apparatus which is used with an image pickup apparatus such as a digital still camera, and particularly relates to an illumination apparatus which is supported so as to surround an outer circumference of an image capturing lens.

2. Description of the Related Art

In micro photography capturing a close distance object, an illumination apparatus with a light emission portion at a tip of an image capturing lens wherein the light emission portion is formed in a ring shape or an arc shape along an outer circumference of the image capturing lens is often used. Japanese Patent Laid-Open No. 2001-215574 discloses an illumination apparatus having a configuration where light sources such as xenon tubes are formed in a circular arc shape and such multiple light sources are arranged along an outer circumference of an image capturing lens to form a ring shaped light emission portion.

The illumination apparatus disclosed in Japanese Patent Laid-Open No. 2001-215574 uses, as the light source, a glass tube, which is manufactured generally as a straight tube such as a xenon tube, formed in an arc shape (curved tubular shape) through a bending process with high accuracy. As a result, there is a problem that a cost to obtain the light source increases and the illumination apparatus becomes expensive. Furthermore, it is difficult to project light emitted from such curved-tubular light sources efficiently and uniformly onto a target object for micro photography. This causes problems that sufficient performance cannot be exhibit in terms of efficiency of light utilization and light distribution.

BRIEF SUMMARY OF THE INVENTION

The present invention provides an illumination apparatus capable of efficiently using light from a light source to perform uniform illumination suitable for micro photography and others without using a curved tubular light source.

The present invention provides as one aspect thereof an illumination apparatus, which is arrangeable so as to surround an image capturing lens. The apparatus includes, when, in a state where the illumination apparatus is arranged so as to surround the image capturing lens, a direction corresponding to a radial direction of the image capturing lens is defined as a radial direction of the illumination apparatus, a direction surrounding the image capturing lens is defined as a circumferential direction of the illumination apparatus, and a direction toward an object field to be captured through the image capturing lens is defined as a light projecting direction of the illumination apparatus, a light source, a first reflective portion provided inside further than the light source in the radial direction so as to extend in the circumferential direction and reflecting light from the light source toward the light projecting direction, and a second reflective portion provided inside further than the light source in the radial direction so as to extend in the radial direction and reflecting the light from the light source toward an area extending to a side away from the light source in the circumferential direction.

The present invention provides as another aspect thereof an illumination apparatus including a first reflective portion formed to have an arc shape, a light source arranged outside further than the first reflective portion in a radial direction of the first reflective portion, a second reflective portion reflecting light from the light source to a side away from the light source in a circumferential direction of the first reflective portion, and an exit portion where the light reflected by the first reflective portion exits. The first reflective portion reflects the light from the light source and the light from the second reflective portion toward the exit portion.

Further features of the present invention will become apparent from the following description of exemplary embodiments (with reference to the attached drawings).

DETAILED DESCRIPTION OF THE EMBODIMENTS

Exemplary embodiments of the present invention will be described below with reference to the accompanied drawings.

Embodiment 1

Figure 1:
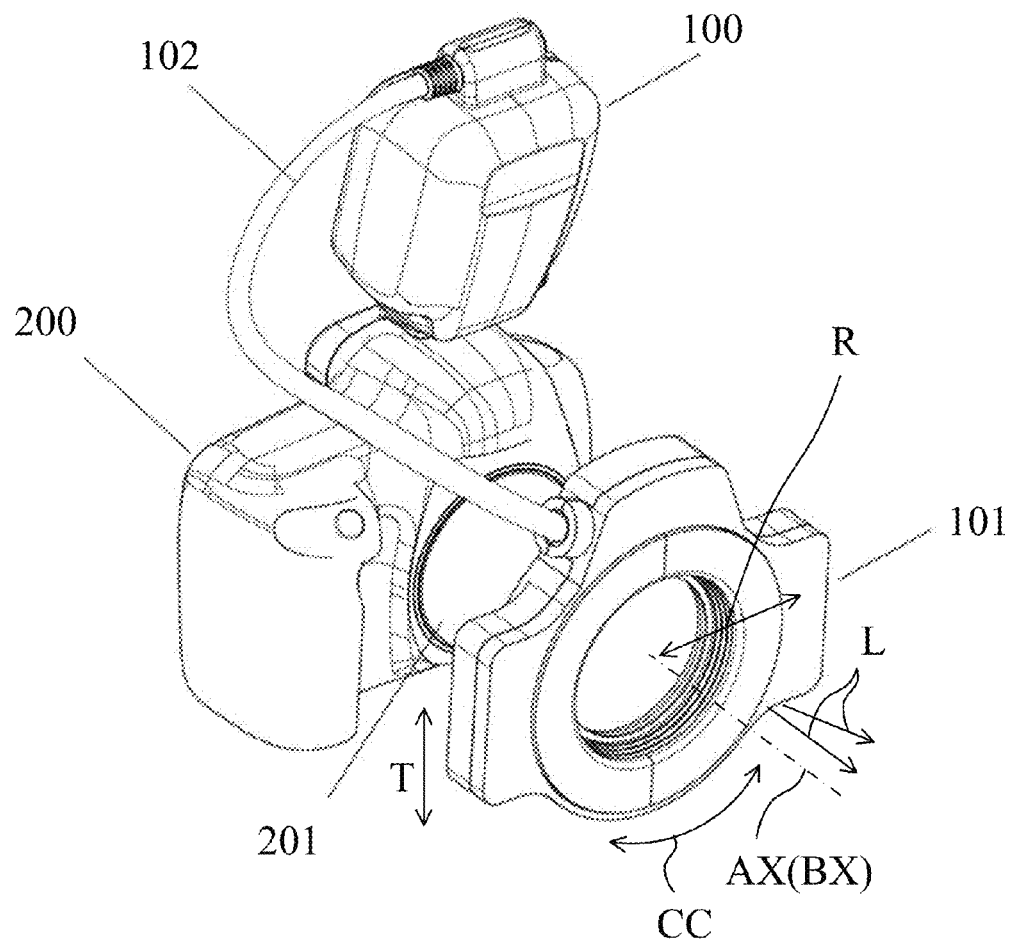
FIG. 1 shows a schematic diagram of an illumination apparatus which is Embodiment 1 of the present invention and an image pickup apparatus to which the illumination apparatus is attached.

FIG. 1 shows an illumination apparatus 101 for micro photography which is Embodiment 1 of the present invention and an image pickup apparatus (hereinafter referred to as "a camera") 200 to which the illumination apparatus 101 is attached (supported) at a tip portion of an image capturing lens 201 so as to surround an outer circumference thereof. The illumination apparatus 101 is detachably attached to the image capturing lens 201. The image capturing lens 201 may be provided integrally with the camera 200 or may be an interchangeable lens which is detachably attached to the camera 200. The illumination apparatus 101 may be detachably attached to the camera 200 instead of the image capturing lens 201 as long as the illumination apparatus 101 can be supported so as to surround the outer circumference of the image capturing lens 201. In the illumination apparatus 101, a microcomputer for controlling light emission from the illumination apparatus 101, a power source, a main condenser for accumulating light emission energy and others are built-in. Furthermore, the illumination apparatus 101 includes a control unit 100 which is to be detachably attached to the hot shoe (not shown) of the camera 200. The illumination apparatus 101 and the control unit 100 are connected with a connection cable 102.

Although it will be described in detail later, two light sources which emit source light becoming illumination light for micro photography and an illumination optical system which projects the light from the two light sources toward an object field (object) are built-in in the illumination apparatus 101. An assist light emitter which projects assist light to a dark object when performing auto focus in the camera 200 may further be built-in in the illumination apparatus 101.

The illumination apparatus 101 may be attached to the image capturing lens 201 so that the two light sources (which are respectively built-in at portions protruding in a radial direction from a ring shaped portion) are arranged symmetrically as shown in FIG. 1 or may be attached at a position rotated in a circumferential direction of the image capturing lens 201 from the above position. Moreover, a shade may be formed intentionally or a direction in which a shade appears may be selected by a user arbitrarily selecting one of the two light sources and causing only the selected light source to emit light.

Emission control of the illumination light from the illumination apparatus 101 can be performed, for example, as follows. First, preliminary light emission where a certain light amount is continuously projected toward an object for a predetermined time period is performed just before main image capturing to measure a luminance distribution on the object by a photometry sensor which is built-in in the camera 200. Then, by using the measured luminance distribution, the amount of luminance in main light emission performed at the time of the main image capturing is decided by a predetermined algorithm. Combination of such light emission control and so-called divisional photometry enables more rigorous light amount control depending on a condition of the object, especially, light amount control appropriate for micro photography which is likely to be affected by errors in light amount.

Next, a configuration of the illumination apparatus 101 will be described in detail. In the following description, in a use state where the illumination apparatus 101 is attached to the image capturing lens 201 and is supported so as to surround the outer circumference of the image capturing lens 201 as shown in FIG. 1, a direction toward the object field to be captured through the image capturing lens 201 is referred to as "a light projecting direction L" or "a front side" of the illumination apparatus 101. The light projecting direction L includes not only a direction parallel to an optical axis (hereinafter, referred to as "a lens optical axis") AX of the image capturing lens 201, but also directions forming a certain angle with the lens optical axis AX. Moreover, a direction corresponding to a radial direction (direction orthogonal to the lens optical axis AX) of the image capturing lens 201 is referred to as "a radial direction R" of the illumination apparatus 101, and a direction surrounding the outer circumference of the image capturing lens 201 is referred to as "a circumferential direction CC." Furthermore, a direction in which a tangent line of the outer circumference (circle) of the image capturing lens 201 extends is referred to as "a tangent direction T" to the circumferential direction CC. In addition, a direction along the optical axis AX of the image capturing lens 201 is referred to as "a thickness direction" of the illumination apparatus 101.

Figure 2A:
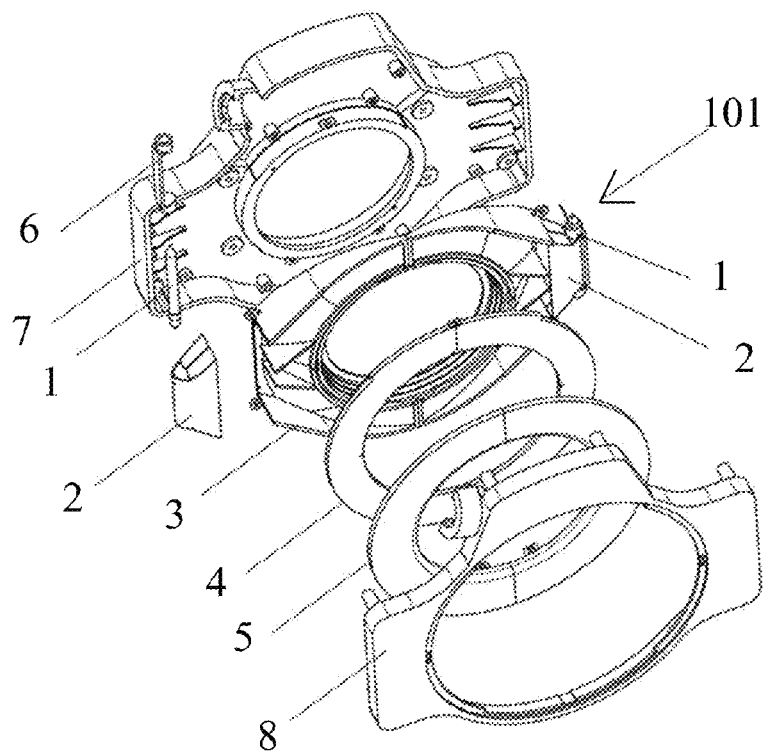
FIGS. 2A and 2B are exploded perspective views of the illumination apparatus of Embodiment 1.
Figure 2B:
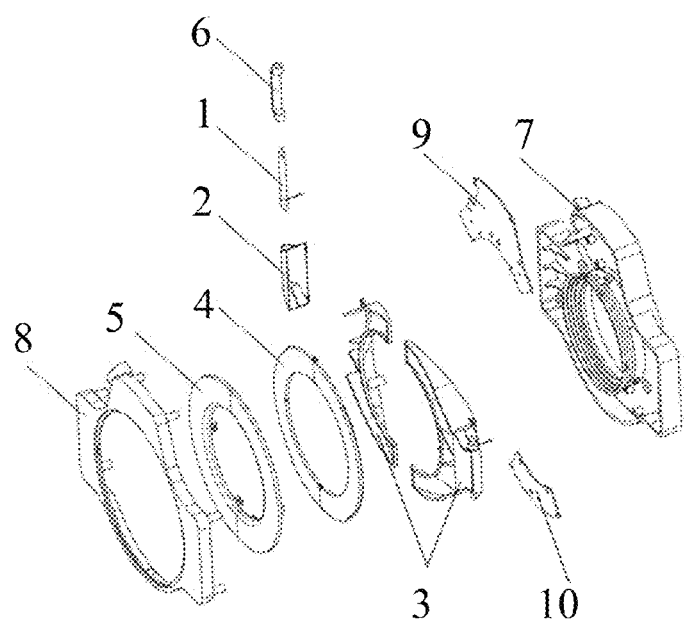
Figure 3:
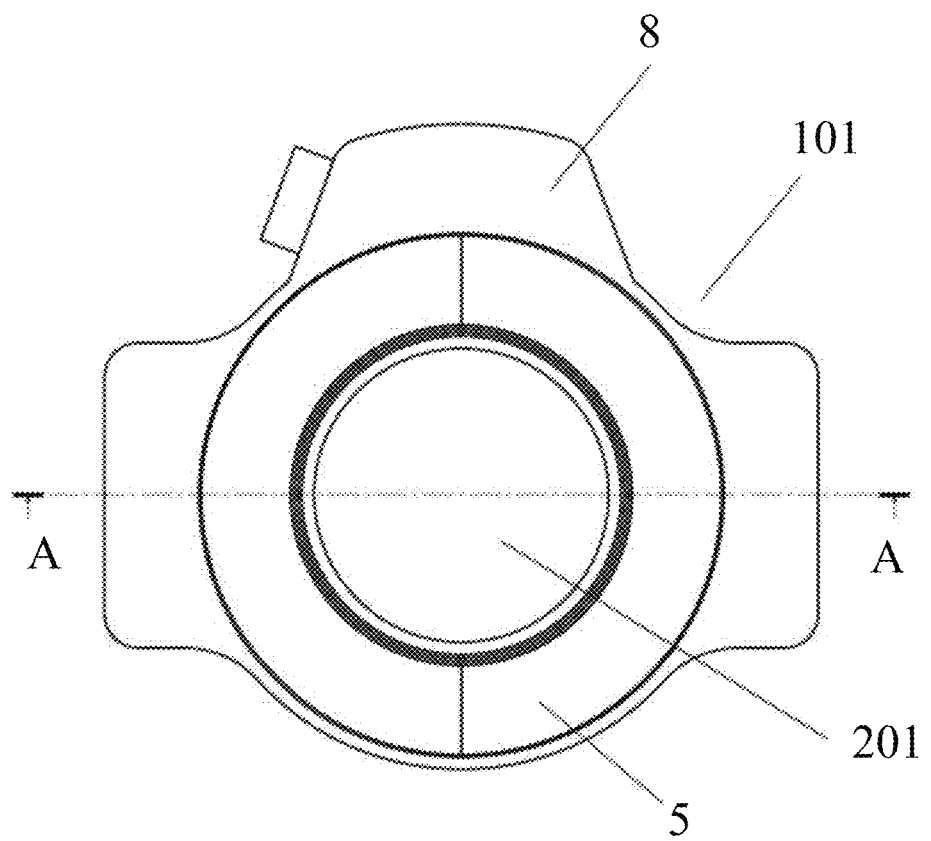
FIG. 3 is a front view of the illumination apparatus of Embodiment 1.
Figure 4A:
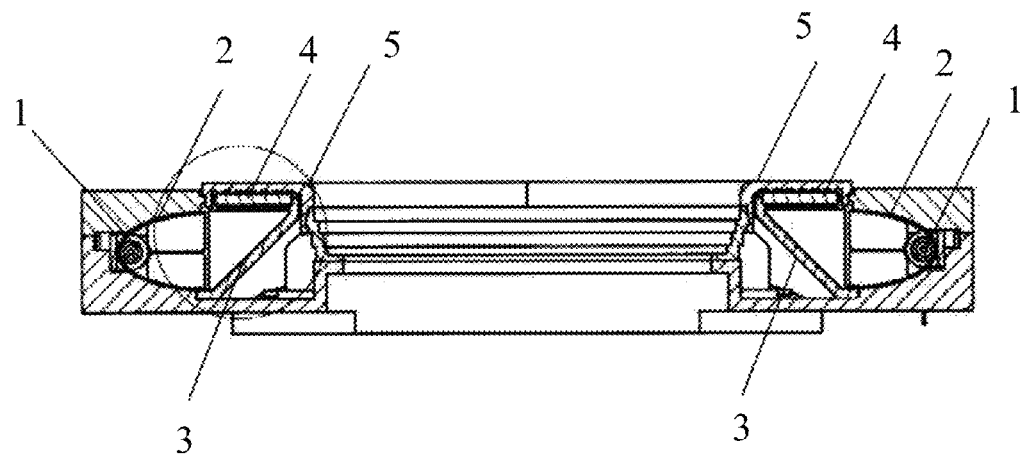
FIGS. 4A and 4B are a sectional view of the illumination apparatus of Embodiment 1 and a partially enlarged view thereof.
Figure 4B:
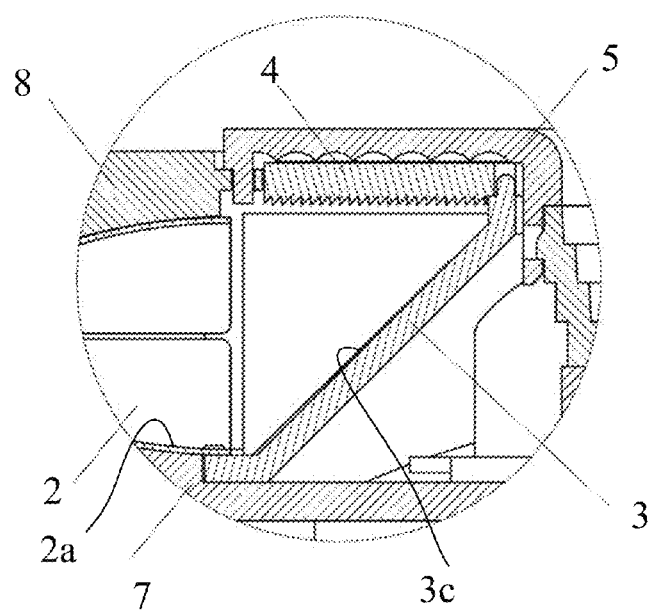
Figure 5A:
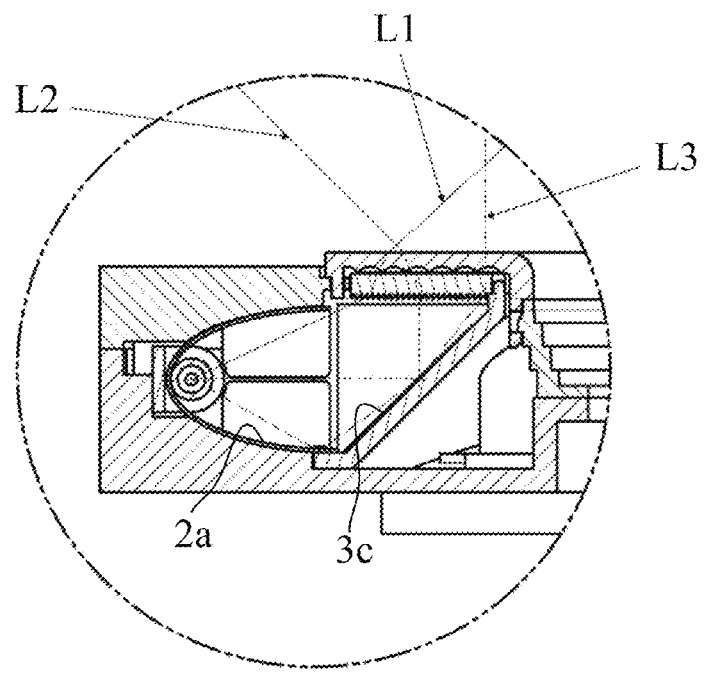
FIGS. 5A and 5B are figures showing optical paths of light rays in the illumination apparatus of Embodiment 1.
Figure 5B:
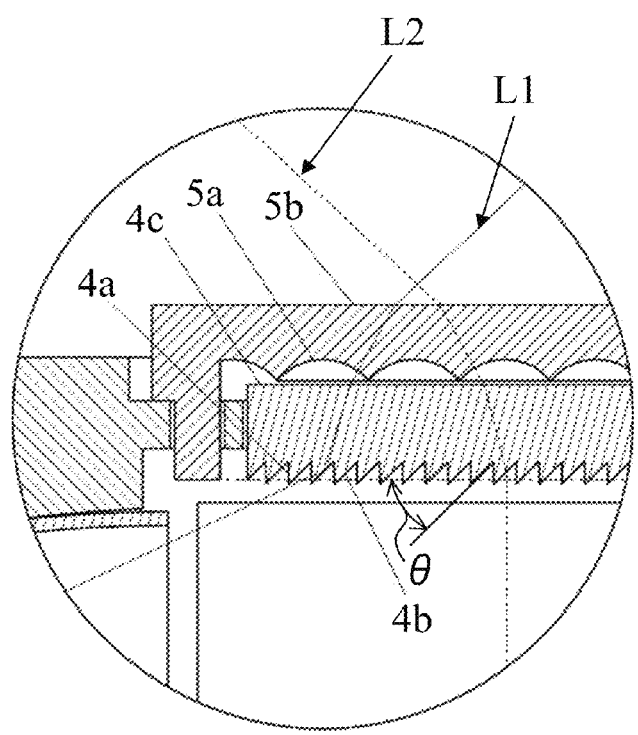
Figure 6A:
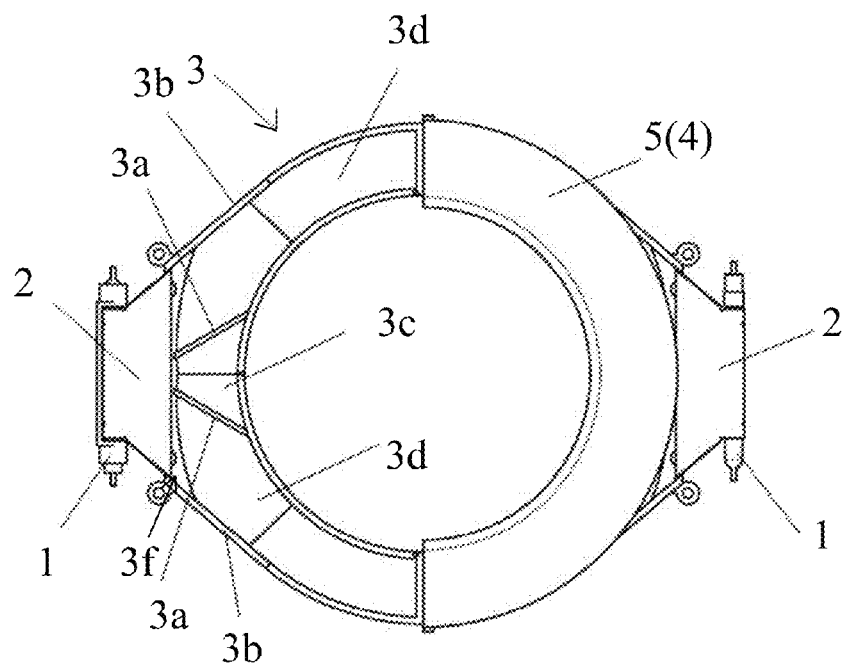
FIGS. 6A and 6B are a front view of an optical system in the illumination apparatus of Embodiment 1 and a schematic view of a reflective light collector and an arc reflector used in the optical system.
Figure 6B:
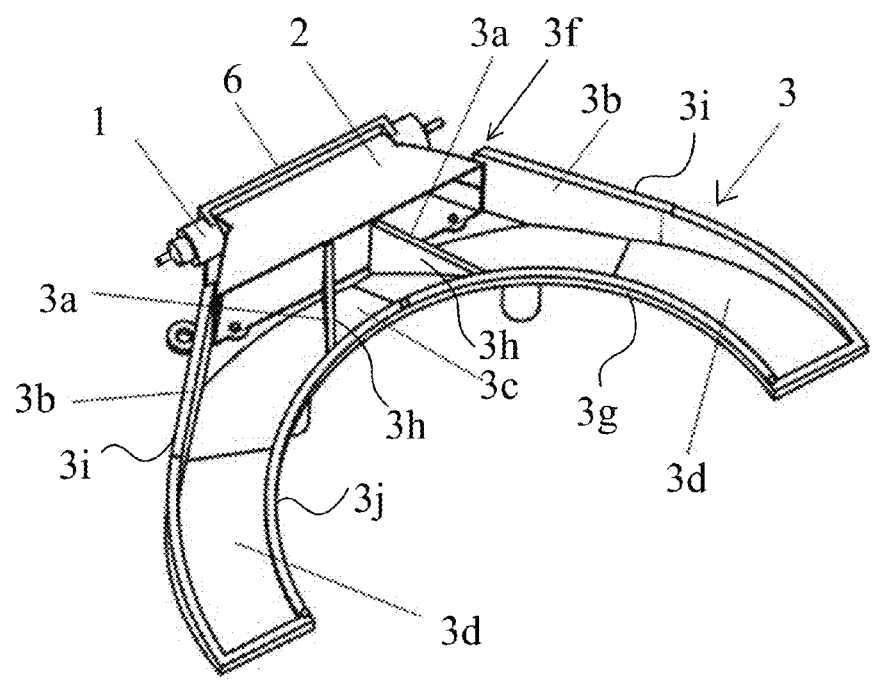

FIGS. 2A and 2B are exploded views of the illumination apparatus 101 when viewed from its diagonally front side. FIG. 3 shows the illumination apparatus 101 when viewed from its front side. FIG. 4A shows a sectional view of the illumination apparatus 101 cut along an A-A line in FIG. 3, and FIG. 4B shows an enlarged view of the circled part in FIG. 4A. FIG. 5A shows optical paths of light rays L1, L2 and L3 which are emitted from a light source 1 described later, and FIG. 5B shows an enlarged view of part of FIG. 5A. Moreover, FIG. 6A shows the illumination optical system constituted by a reflective light collector 2, an arc reflector 3, a prism panel 4 (not shown in FIG. 6A) and a light diffusing panel 5 when viewed from its front side. In the left half of FIG. 6A, the prism panel 4 and the light diffusing panel 5 are removed. FIG. 6B is an enlarged view of the arc reflector 3 when viewed from its diagonally front side.

Figure 7A:
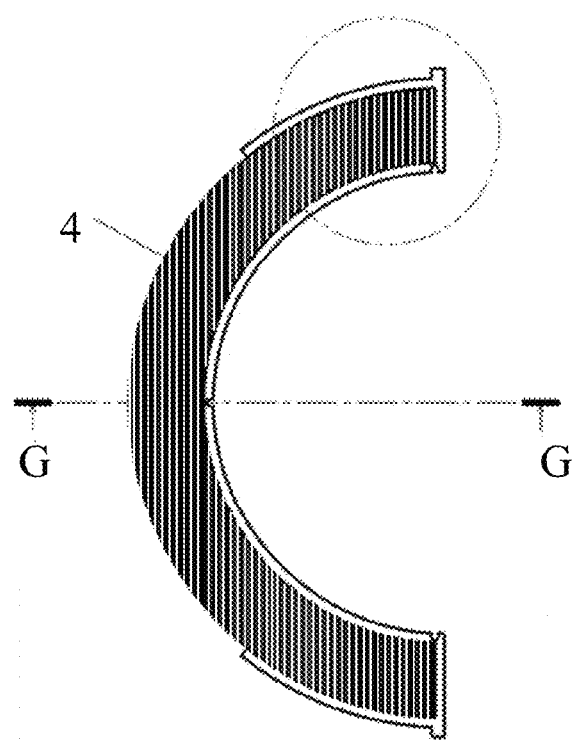
FIGS. 7A and 7B are a back view and a sectional view of a prism panel used in the illumination apparatus of Embodiment 1.
Figure 7B:
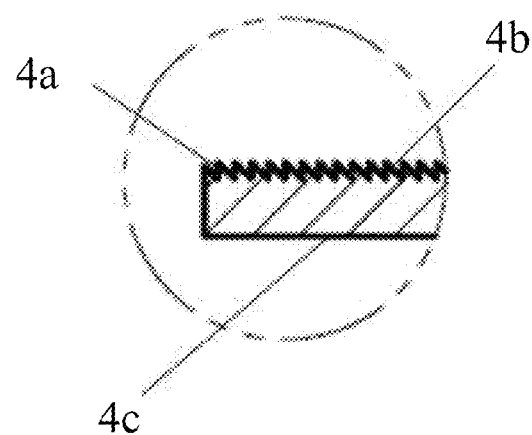
Figure 8A:
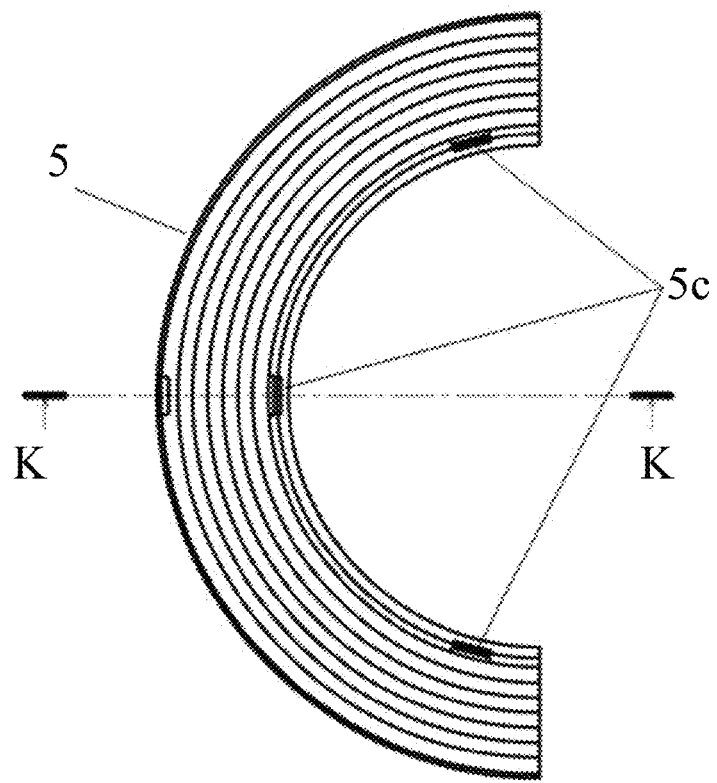
FIGS. 8A and 8B are a back view and a sectional view of a light diffusing panel used in the illumination apparatus of Embodiment 1.
Figure 8B:
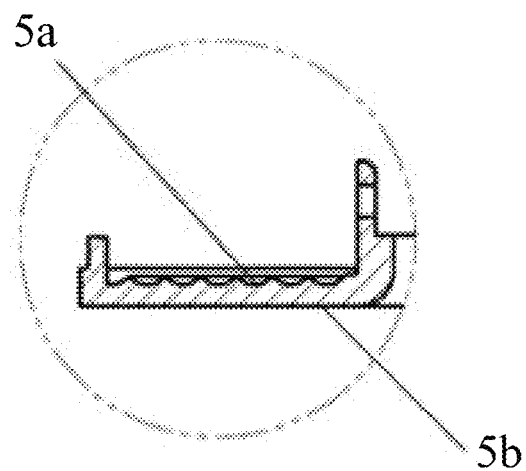
Figure 9:
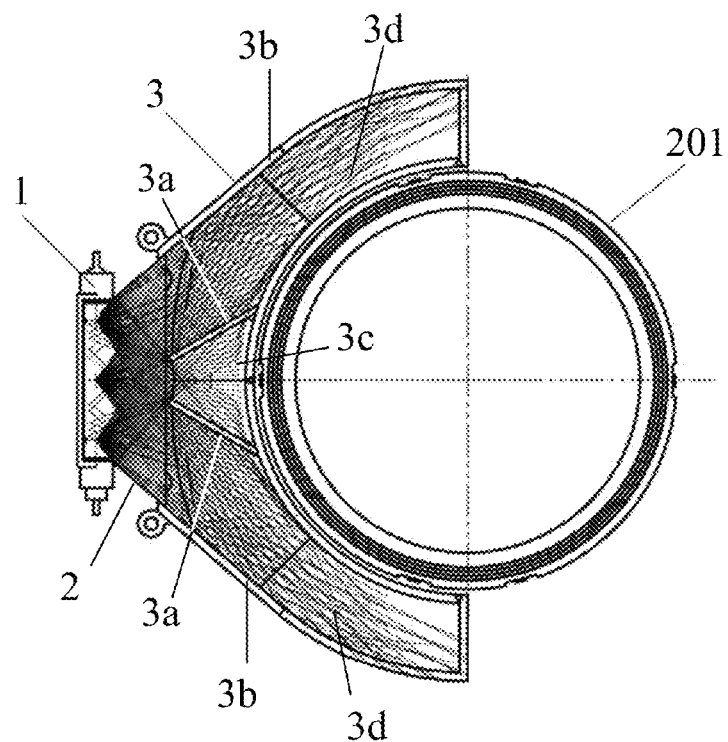
FIG. 9 is a ray tracing chart of the illumination apparatus of Embodiment 1.

FIG. 7A shows the prism panel 4 when viewed from its back side (entrance surface side). FIG. 7B shows a sectional view along a G-G line in FIG. 7A. FIG. 8A shows the light diffusing panel 5 viewed from its back side (entrance surface side). FIG. 8B shows a sectional view along a K-K line in FIG. 8A. FIG. 9 shows the light rays emitted from the light source 1 when viewed from the front side.

The illumination apparatus 101 has a symmetric configuration with respect to a center plane (plane of symmetry) which includes a center axis (axis coinciding with the lens optical axis AX in the use state) BX of the illumination apparatus 101 and on both sides of which two light sources are arranged. Therefore, in the following, a configuration of one side (left side) of the symmetric configuration will be described mainly and the other side (right side) of the symmetric configuration will be described as needed.

In Embodiment 1, a straight tubular light source such as a discharge light emitting tube (such as a xenon tube) or a cold-cathode tube is used as each of the light sources 1. The light source 1 is arranged so that the longitudinal direction thereof coincides with the tangent direction T. In this embodiment, the light sources 1 are respectively arranged on the left side and the right side, and their longitudinal directions coincides with the tangent direction T and are parallel to each other. As each light source 1, a linear light source constituted by multiple LEDs linearly arranged may be used or a single light source which is not a curved-tubular may be used, instead of the straight tubular light source. Inside the illumination apparatus 101, electronic components such as a trigger coil to cause the light source 1 to start light emission, a light-receiving sensor to monitor a light amount emitted from the light source 1 and others are housed.

A reflective light collector 2 includes a reflective surface 2a which reflects, of the light diverging from an entire outer circumference of the light source 1, light proceeding toward directions other than a direction toward the arc reflector 3 and the prism panel 4. Parts of the reflective surface 2a are provided on both sides of the light source 1 in the thickness direction and on both sides of the light source 1 in its longitudinal direction. The reflective surface 2a reflects the light so that it proceeds toward the arc reflector 3 and the prism panel 4 and then is emitted through a light exit opening formed between edge portions of the reflective surface 2a. Furthermore, the reflective light collector 2 causes, of the light diverging from the light source 1, light which directly proceeds toward the arc reflector 3 and the prism panel 4 to be emitted through the light exit opening without reflecting that light.

The reflective light collector 2 is manufactured so that the light can be efficiently reflected, by being formed integrally with the reflective surface 2a with a high reflectance material such as bright aluminum or by forming the reflective surface 2a by depositing a metallic material having a high reflectance on an inner surface of a plastic body. The reflective surface 2a of the reflective light collector 2 is formed in an elliptical shape having two focal points in a sectional plane orthogonal to the longitudinal direction of the light source 1 (that is, one tangent direction T of the illumination apparatus 101).

The elliptical shape in the sectional plane of the reflective light collector 2 (reflective surface 2a) is desirable to be set so that one of the two focal points thereof is located at a center in a radial direction of the light source 1 (that is, on a light source side) and the other focal point thereof is located on a first reflective surface (that is, on a first reflective surface side) of the arc reflector 3. Such setting makes it possible to collect, as shown in FIG. 5A, the light reflected by the reflective light collector 2 to cause the light to reach farther. Arbitrarily optimizing the elliptical shape enables adjustment of directivity of the light reflected by the reflective light collector 2, which makes it possible to cause the reflected light to reach sufficiently far even if the reflective light collector 2 is small in size. Thereby, the light can be emitted from a broad area (light exit portion) in the circumferential direction CC and the radial direction R.

The sectional shape of the reflective surface 2a of the reflective light collector 2 may be shapes other than the elliptical shape, such as a quadratic curve shape.

The arc reflector 3 is manufactured by depositing a metallic material having a high reflectance on a plastic main body which is formed in a half circle shape (arc shape) so as to form a ring shape with two arc reflectors. That is, centers of the arc shape of the two arc reflectors 3 coincide with each other. Each of the arc reflectors 3 is provided for each of the two light sources 1 (that is, two arc reflectors 3 are provided in total), and a reflective surface described below is formed in each of the two arc reflectors 3.

As shown in FIGS. 6A and 6B, the arc reflector 3 includes first reflective surfaces 3c and 3d which are formed inside further than the light source 1 in the radial direction R so as to extend in the circumferential direction CC and which reflect the light (including the light reflected by the reflective light collector 2) from the light source 1 in the light projecting direction L. Of the first reflective surfaces 3c and 3d, the first reflective surface 3c is a light source side reflective surface (first area) which is a portion facing a longitudinal central portion of the light source 1. Moreover, of the first reflective surfaces 3c and 3d, the first reflective surface 3d includes two arc reflective surfaces (second areas) formed so as to extend in an arc shape toward both sides from the light source side reflective surface 3c in the circumferential direction CC, that is, so as to extend away from the light source 1 in the circumferential direction CC. In the following description, a space formed between the light source side and arc reflective surfaces 3c and 3d and the prism panel 4 disposed further forward in the light projecting direction L than the reflective surfaces 3c and 3d is referred to as "an optical path area".

The arc reflector 3 includes, in addition to the light source side and arc reflective surfaces 3c and 3d, two second reflective surfaces 3a. As shown in FIG. 9, the second reflective surfaces 3a reflect part of the light that proceeds toward the light source side reflective surface 3c from the light source 1, toward the optical path area extending in directions away from the light source 1 in the circumferential direction CC along the arc reflective surfaces 3d. In a case where no second reflective surface 3a is provided, a larger part of the light emitted from the light source 1 proceeds toward the light source side reflective surface 3c as compared with that proceeding toward the arc reflective surfaced 3d. If such a larger part of the light is reflected by the light source side reflective surface 3c to the light projecting direction L without change, a large light amount difference occurs between a part near the light source 1 of the light exit portion (described later) and a part thereof away from that part in the circumferential direction CC.

Therefore, this embodiment provides, between the light source side reflective surface 3c and the two arc reflective surfaces 3d, the two second reflective surfaces 3a like partition walls which partition these reflective surfaces 3c and 3d; the two second reflective surfaces 3a are orthogonal to a plane along the radial direction R. In other words, the two second reflective surfaces 3a are disposed so as to be apart from each other in the longitudinal direction of the light source 1 and to be symmetric with respect to a central sectional plane passing through a longitudinal center of the light source 1 and being orthogonal to the longitudinal direction of the light source 1. In further other words, the two second reflective surfaces 3a are not parallel to the light source side reflective surface 3c and the two arc reflective surfaces 3d. The two second reflective surfaces 3a are disposed so that a distance between two second reflective surfaces 3a in the circumferential direction CC becomes narrower (closer) as being located closer to the light source 1 in the radial direction R.

Of the light proceeding toward the light source side reflective surface 3c from the light source 1, light reflected by one of the two second reflective surfaces 3a proceeds toward the optical path area along one of the arc reflective surfaces 3d. On the other hand, of the light proceeding toward the light source side reflective surface 3c from the light source 1, light reflected by the other one of the two second reflective surfaces 3a proceeds toward the optical path area along the other one of the arc reflective surfaces 3d. Furthermore, of the light proceeding toward the light source side reflective surface 3c from the light source 1, light which is not reflected by the two second reflective surfaces 3a reaches the light source side reflective surface 3c. The positions and shapes of the two second reflective surfaces 3a disposed between the light source side reflective surface 3c and the two arc reflective surfaces 3d are decided so that a light amount emitted from the light exit portion having an arc shape (or a ring shape) becomes uniform. That is, providing the second reflective surfaces 3a at appropriate positions and in an appropriate shape makes it possible to distribute the light proceeding toward the light source side reflective surface 3c from the light source 1 almost uniformly in the entire first reflective surfaces 3c and 3d (first and the second areas).

In addition, reflecting the light distributed uniformly by the first reflective surfaces 3c and 3d to the light projecting direction L causes light with a uniform light amount to proceed to the arc shaped light exit portion which faces the first reflective surfaces 3c and 3d. In such way, the lights from the two light sources 1 are uniformly distributed to the ring shaped light exit portion which extends in the circumferential direction CC by the first reflective surfaces 3c and 3d and the second reflective surfaces 3a, which are provided for each light source 1, and exit to the light projecting direction L. The arc reflector 3 will be described more in detail later.

The prism panel (first optical member) 4 is disposed at the light exit portion formed further forward in the light projecting direction L than the arc reflector 3. The prism panel 4 is manufactured so as to have a half circle shape (arc shape) with a light transmissive plastic material having a high light transmittance such as acrylic plastic. Two prism panels 4 are assembled in a ring shape.

In a sectional plane orthogonal to the longitudinal direction of the light source 1, the light (including light reflected by a portion near the light source 1 of the reflective light collector 2 and then returned to the light source 1 to be emitted from the light source 1 again) is divided into four types of light rays which follow mutually different optical paths. FIG. 5A shows three types of light rays L1, L2 and L3 among the four types of light rays. The light ray L1 is emitted from the light source 1 and reaches the prism panel 4 without being reflected by the first reflective surface 3c (3d) of the arc reflector 3. The light ray L2 is emitted from the light source 1 and reaches the prism panel 4 without being reflected by the reflective light collector 2 but with being reflected by the first reflective surface 3c (3d) of the arc reflector 3. The light ray L3 is emitted from the light source 1, reflected by the reflective light collector 2, further reflected by the first reflective surface 3c (3d) of the arc reflector 3 and then reaches the prism panel 4. Although not shown, the light ray L4 is emitted from the light source 1, reflected by the reflective light collector 2 and then reaches the prism panel 4 without being reflected by the first reflective surface 3c (3d) of the arc reflector 3.

In an entrance surface of the prism panel 4, a prism array constituted of multiple minute prism portions is formed. Each prism portion of the prism array extends along the longitudinal direction of the light source 1 (one tangent direction T) and allows, of the among the light from the light source 1, light reaching the prism portion after being reflected by the first reflective surfaces 3c and 3d of the arc reflector 3 to be transmitted therethrough to the light projecting direction L. Furthermore, each prism portion reflects at least light reaching without being reflected by the first reflective surfaces 3c and 3d to the light projecting direction L. Specifically, as shown in FIGS. 5A and 5B, each prism portion includes a first surface 4a where the light ray L1 enters and a second surface 4b where the light rays L2 and L3 enter. The light ray L4, which is not shown, also enters the first surface 4a. When a plane along the radial direction R is defined as a reference plane as indicated by a dashed-dotted line in FIG. 5B, an angle of the first surface 4a forming with the reference plane (in this embodiment, 90°) is larger than an angle θ of the second surface 4b forming with the reference plane.

The light rays L2 and L3 entering the second surfaces 4b are refracted thereat, transmitted through the prism panel 4 and then refracted at an exit surface (flat surface) 4c to exit therefrom to the light projecting direction L (that is, a light diffusing panel (5) side). When the light rays L2 and L3 reach the second surface 4b at a position near the light source 1, as shown in FIGS. 5A and 5B that show the light ray L2 as an example, they enter at small incident angles with respect to the second surface 4b. Therefore, these light rays L2 and L3 are refracted at the second surface 4b so as to be inclined in a direction away from the center axis BX to the radial direction R and then exit from the prism panel 4. When the light rays L2 and L3 reach the second surface 4b at a position apart from the light source 1, as shown in FIG. 5A that shows the light ray L3 as an example, they enter the second surface 4b at large incident angles. Therefore, these light rays L2 and L3 are refracted approximately in parallel with the center axis BX at the second surface 4b and then exit from the prism panel 4.

On the other hand, the first surface 4a refracts the entering light ray L1 (L4) to direct it toward the second surface 4b. The second surface 4b is formed so as to satisfy a total reflection condition for the light ray L1 (L4). Therefore, the light ray L1 is internally totally reflected at the second surface 4b to be transmitted through the prism panel 4 and exits from the exit surface 4c to the light projecting direction L (light diffusing panel (5) side). In such way, the prism portion directs especially the light ray L1 reaching the prism portion without being reflected by the first reflective surface of the arc reflector 3 to the light projecting direction L, which improves use efficiency of the light emitted from the light source 1.

Depending on a position in the circumferential direction CC where the light ray (L1, L4) enters the prism panel 4, an exit angle of the light ray exiting from the prism panel 4 varies. When tilt angles of the first and second surfaces 4a and 4b are the same in the entire prism array, an incident angle of the light ray entering the first surface 4a near the light source 1 is larger than that of the light ray entering the first surface 4a apart from the light source 1. Therefore, the exit angle of the former light ray is greater than that of the latter light ray. In such way, an exit direction of the light ray (L1, L4) changes depending on the incident positions of the light rays reaching the prism panel 4 and on distances from the light source 1. However, an entire light flux that is a bundle of the light rays is converted into a light flux with a uniform light amount distribution in a range from a direction parallel to the center axis BX to a direction slightly inward in the radial direction R.

In this embodiment, as shown in FIG. 5B, the tilt angle θ of the second surfaces 4b forming with the reference plane (indicated by the dashed-dotted line in the figure) along the radial direction R is 42.5° which is constant throughout the entire prism array. In such case, setting the incident angle (angle forming with a normal line to the reference plane) of the light ray (L1, L4) reaching the prism panel 4 to 47.5° or greater makes it possible to cause the light ray to enter the prism portion from the first surface 4a and to cause it to internally totally reflect at the second surface 4b and exit from the prism panel 4. On the other hand, setting the incident angle of the light ray (L2, L3) reaching the prism panel 4 to a smaller angle than 47.5° makes it possible to cause the light ray to enter the prism portion from the second surface 4b and to cause it to refract without being internally totally reflected to exit from the prism panel 4.

The tilt angle θ of the second surface 4b is not limited to 42.5°, and the angle of the first surface 4a forming with the reference plane is also not limited to 90°. In other words, these angles may be other angles.

Furthermore, the prism array constituted of the prism portions extending along the longitudinal direction of the light source 1 does not need to be formed on the entire entrance surface of the prism panel 4, and may be formed in at least a partial area near the light source 1.

A light diffusing panel (second optical member) 5 is arranged further forward in the light projecting direction L than the prism panel 4 in the light exit portion. The light diffusing panel 5 is manufactured with a light transmissive plastic material having a high transmittance such as acrylic plastic, and two light diffusing panels 5 are assembled in a ring shape. In an entrance surface of each light diffusing panel 5, as shown in FIGS. 5A and 5B, multiple cylindrical lens portions (light diffusive portions) 5a are concentrically formed so as to each extend in an arc shape in the circumferential direction CC. Each cylindrical lens portion 5a has a function of diffusing light rays entering it by refracting the light rays in the radial direction R. The light rays refracted by the cylindrical lens portion 5a exit from an exit surface 5b of the light diffusing panel 5 to be projected on the object field (object).

In such way, the light diffusing panel 5 diffuses in the radial direction R the light which is emitted from the light source 1 and proceeds to the circumferential direction CC and whose direction is changed to the light projecting direction L by the arc reflector 3 or the prism panel 4. Accordingly, a light amount distribution of the illumination light can be made uniform in the radial direction R while increasing a size in the radial direction R of a light projection range that is an object side range where the illumination light is projected to a size suitable for micro photography with almost no change in the exit direction of the light exiting from the prism panel 4 in the circumferential direction CC. Combination of such a light diffusing panel 5 and the prism panel 4 makes it possible to efficiently guide the light from the light source 1 to the light projection range suitable for micro photography and to perform illumination with a uniform light distribution within the light projection range.

Reference numeral 6 denotes an elastic holder to fix the light source 1 with respect to the reflective light collector 2. Reference numeral 7 denotes a back cover to hold mount substrates 9 and 10 on which the above-mentioned members constituting the illumination optical system and the above-mentioned electronic components are mounted. Reference numeral 8 denotes a front cover which covers the light sources 1 and the reflective light collectors 2 in a front face of the illumination apparatus 101 and which includes a circular opening exposing the light exit portion where the two prism panels 4 and the two light diffusing panels 5 are arranged. At an inner circumferential portion of the opening of the front cover 8, engaging portions to holding the prism panels 4 and the light diffusing panels 5 are formed.

The reflective light collector(s) 2 and the light source(s) 1 thereinside are covered with the front cover 8, so that they cannot be seen through the light diffusing panels 5 and the prism panels 4 from the front side of the illumination apparatus 101.

Next, the shape and others of the arc reflector 3 will be described in detail with reference to FIGS. 6A and 6B. The arc reflector 3 includes an entrance opening 3f into which an outer surface of the reflective light collector 2 near the light exit opening is fit and an arc shaped bottom portion 3g on which the light source side and arc reflective surfaces 3c and 3d as the first reflective surfaces are formed by metal deposition. The light source side reflective surface 3c is formed as part of a conical surface having a tilt angle of 45° with respect to the reference plane along the radial direction R in the above-mentioned central sectional plane passing through the longitudinal center of the light source 1.

Figure 10:
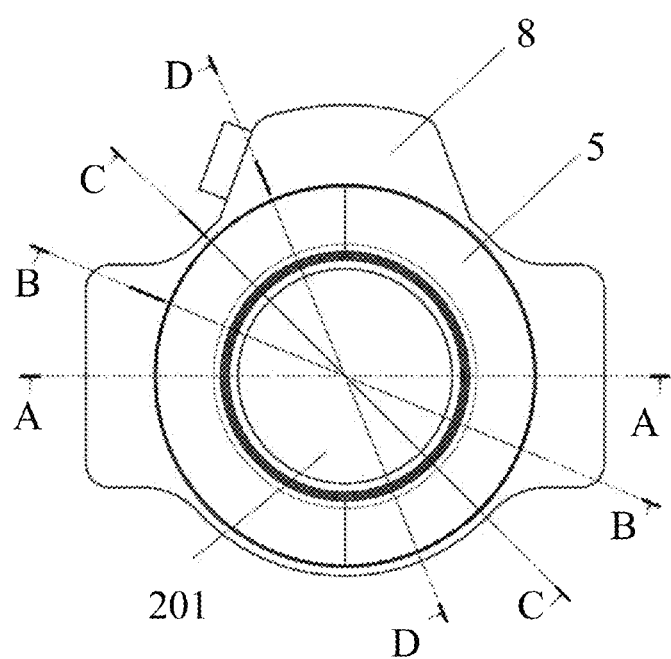
FIG. 10 shows positions of cutting planes in the illumination apparatus of Embodiment 1.
Figure 11A:
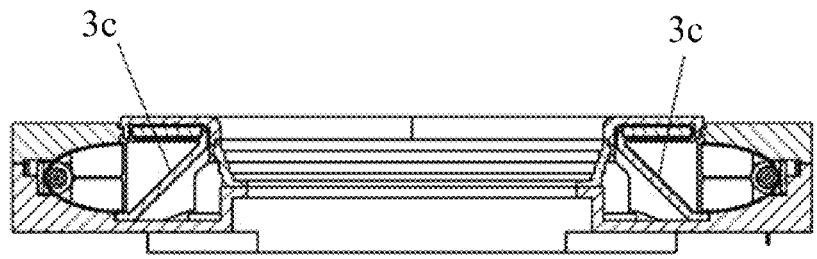
FIGS. 11A to 11D show sectional views corresponding to the cutting planes show in FIG. 10.
Figure 11B:
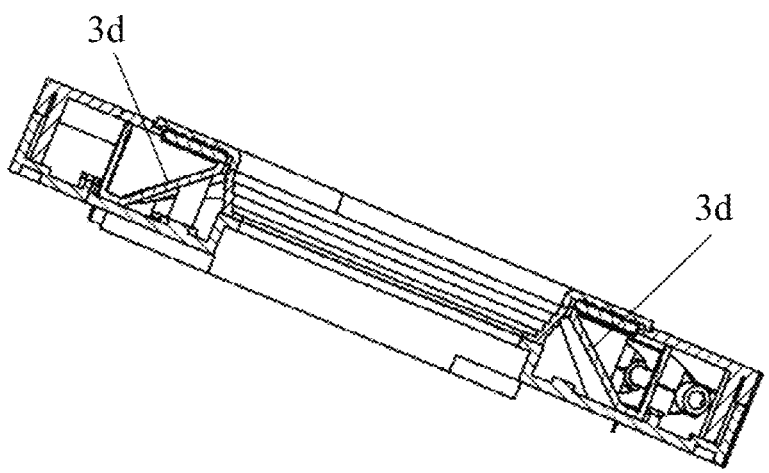
Figure 11C:
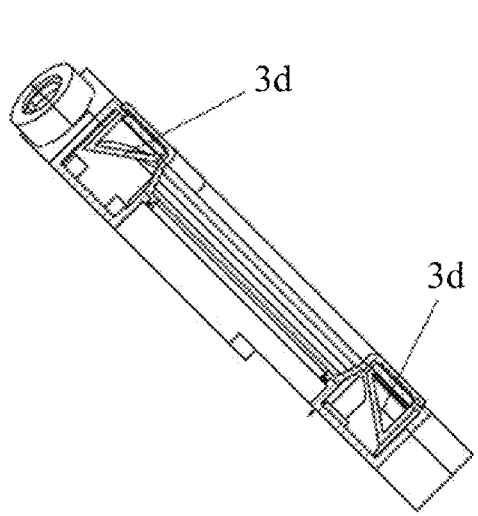
Figure 11D:
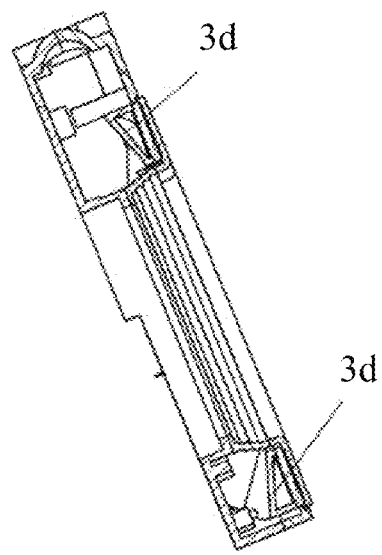

Each of the arc reflective surfaces 3d is formed, basically, as a surface tilted with respect to the reference plane along the radial direction R so as to be located further forward in the light projecting direction L (that is, so as to increase its height in the light projecting direction L) as being located away from the light source 1 (and the reflective light collector 2) in the circumferential direction CC. However, in this embodiment, as shown in FIGS. 11A to 11D which are sectional views respectively corresponding to A-A, B-B, C-C and D-D lines in FIG. 10, positions (heights) in the light projecting direction L are different between an inner circumferential side portion and an outer circumferential side portion of the arc reflective surface 3d in the radial direction R (specifically, the inner circumferential side portion is higher than the outer circumferential side portion).

Moreover, the arc reflective surface 3d is formed as a twisted spiral surface in which a height of its outer circumferential side portion increases as being located away from the reflective light collector 2 in the circumferential direction CC while maintaining a higher height of its inner circumferential side portion than that of the outer circumferential side portion. This is to prevent concentration of light on the outer circumferential side portion of the arc reflective surface 3d causing reduction of light proceeding toward the inner circumferential side portion thereof. That is, providing a higher height to the inner circumferential side portion of the arc reflective surface 3d than that of the outer circumferential side portion thereof from a close side to the reflective light collector 2 (and the light source 1) positively guides the light reaching the arc reflective surface 3d to the light exit portion (that is, the prism panel 4). Thereby, light with a uniform light amount distribution exits from the arc shaped (ring shaped) light exit portion to the light projecting direction L.

The arc reflector 3 further includes two partition walls 3h on which the two second reflective surfaces 3a, which are disposed between the light source side reflective surface 3c and the two arc reflective surfaces 3d, are formed by metal deposition.

The arc reflector 3 further includes outer circumferential wall portions 3i which respectively extend along outer circumferences of the two arc reflective surfaces 3d and whose inner circumferential surfaces are formed as outer circumferential reflective surfaces 3b by metal deposition. As can be seen in FIG. 9, part of the light that is reflected by the second reflective surfaces 3a proceeds to the optical path area along the arc reflective surfaces 3d after being reflected by the outer circumferential reflective surfaces 3b. Such a configuration makes it possible to cause the light from the light source 1 to reach the optical path area further away in the circumferential direction CC from the light source 1. In addition, there is also light reaching the outer circumferential reflective surfaces 3b directly from the light source 1 or the reflective light collector 2 to be reflected thereby. The outer circumferential reflective surfaces 3b can cause such light to reach areas of the prism panel 4 further away in the circumferential direction CC from the light source 1.

The outer circumferential reflective surfaces 3b also prevent the light emitted from the light source 1 from leaking outside the arc reflector 3.

Furthermore, the arc reflector 3 includes an inner circumferential wall portion 3j extending along inner circumferences of the light source side reflective surface 3c and the two arc reflective surfaces 3d. On an inner surface of the inner circumferential wall portion 3j, a reflective surface is also formed by metal deposition. The light exit portion which is an arc shaped (ring shaped) opening formed between the inner circumferential wall portion 3j and the outer circumferential wall portion 3*i* has a substantially same shape as arc shaped outer circumferences of the prism panel 4 and light diffusing panel 5. Thereby, the light emitted from the light source 1 can be guided efficiently to the prism panel 4 and the light diffusing panel 5.

Part of the outer circumferential wall portion 3*i* near the light exit opening of the reflective light collector 2, that is, part thereof from the light source 1 to the arc reflective surface 3*d* extends in the tangent direction of the arc shaped outer circumferences of the prism panel 4 and light diffusing panel 5. Thereby, the light from the light source 1 can be used efficiently without being blocked.

Next, a supplemental description will be given for the prism panel 4. As described above, the entrance surface (light source (1) side surface) of the prism panel 4 is formed so that the multiple prism portions each extending along the longitudinal direction of the light source 1 form the prism array. Each prism portion is provided with the first surface 4*a* formed on the closer side to the light source 1 and serving as a transmissive surface and the second surface 4*b* formed at the back of the first surface 4*a* (on the farther side from the light source 1) and serving as a transmissive surface and an internal total reflective surface.

Figure 12:
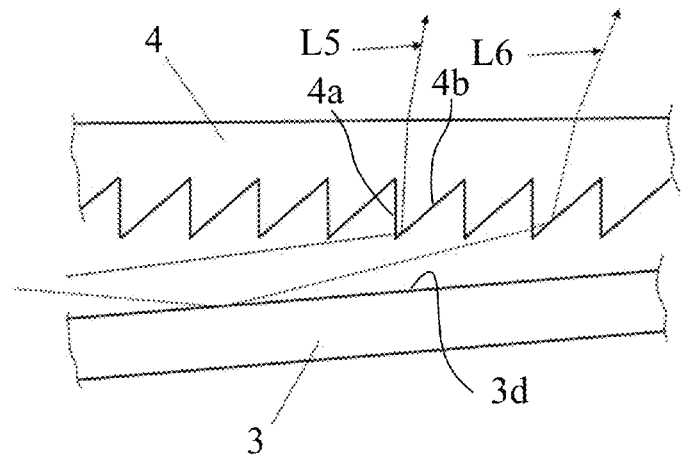
FIG. 12 shows light rays at the light exit portion of the illumination apparatus of Embodiment 1.

As shown in FIG. 12, most of the light (light rays L5 and L6) distributed toward the both sides in the circumferential direction CC by the two second reflective surfaces 3*a* of the arc reflector 3 to proceed toward parts of the optical path area far away from the light source 1 enters the prism portions from their first surfaces 4*a*. Then, the entering light is internally totally reflected at the second surfaces 4*b*, thereby its direction is changed drastically, and then the light exits to the light projecting direction L. The light ray L5 is reflected by the second reflective surface 3*a* and reaches the first surface 4*a* without being reflected by the arc reflective surface 3*d*. The light ray L6 is reflected by the second reflective surface 3*a*, further reflected by the arc reflective surface 3*d* and then reaches the first surface 4*a*. The light reaching the first surfaces 4*a* rarely returns to an arc reflector (3) side again.

In such way, almost all of the light guided to the parts of the optical path area far away from the light source 1 by the reflection by the second reflective surfaces 3*a* of the arc reflector 3 enters the prism panel 4 (prism portions) from the first surfaces 4*a*, which is different from the light in part of the optical path area near the light source 1. Then, the direction of the light is changed at the second surfaces 4*b*, and the light efficiently exits to the light projecting direction L. Although the light exiting from the prism panel 4 enters the cylindrical lens portions 5*a* formed in the light diffusing panel 5 so as to extend in the circumferential direction CC, light exiting from an area of the prism panel 4 far away from the light source 1 is less likely to be affected by a refractive power of the cylindrical lens portion 5*a* and therefore exits from the light diffusing panel 5 to the light projecting direction L without drastic change of its proceeding direction from that when exiting from the prism panel 4.

Accordingly, as long as light uniformly enters the entrance surface (first and second surfaces 4*a* 4*b*) of the entire prism panel 4, light having a uniform light amount distribution can be emitted from the entire arc shaped (ring shaped) light exit portion. Furthermore, setting the angle of the first surface 4*a* forming with the reference plane formed on the light source side to 90° makes it possible to significantly efficiently guide the light emitted from the light source 1 to the light projecting direction L.

Moreover, arbitrarily changing the shape of the arc reflective surface 3*d* of the arc reflector 3 makes it possible to adjust amounts of light entering each area of the prism panel 4.

Thereby, even if a factor causing a light amount unevenness exits in an emission characteristic of the light source 1, a reflection characteristic of the reflective light collector 2 or the like, the light having a uniform light amount distribution can be emitted from the entire light exit portion.

In this embodiment, the ring shaped light exit portion is formed by assembling the two arc shaped light exit portions. In this configuration, light from one of the light exit portions compensates for light from the other one of the light exit portions at a boundary between the two light exit portions, which enables uniform illumination of a light projecting area without a discontinuity.

As described above, in this embodiment, the reflection of the light from the light source 1 by the first reflective surfaces 3*c* and 3*d* of the arc reflector 3 enables forming the light exit portion extending to the circumferential direction, without using a curved-tubular light source. Furthermore, guiding part of the light from the light source 1 to the circumferential direction CC by the second reflective surfaces 3*a* of the arc reflector 3 enables the light from the light source 1 to uniformly exit from the light exit portion. Thereby, an illumination apparatus can be achieved which is capable of efficiently utilizing the light from the light source 1 and performing uniform illumination suitable for micro photography.

Although the light exit portion of the illumination apparatus has a ring shape (circle shape) in this embodiment, the light exit portion may have a rectangular shape or a polygonal shape. In such a case, a direction corresponding to the radial direction of the image capturing lens (for example, a direction in which diagonal lines of the rectangular shape or the polygonal shape extend) can be defined as the radial direction of the illumination apparatus, and a direction surrounding the outer circumference of the image capturing lens can be defined as the circumferential direction of the illumination apparatus.

Furthermore, in this embodiment, the height of the arc reflective surface 3*d* of the arc reflector 3 in the light projecting direction L changes smoothly in the circumferential direction CC. However, the height may change in a step manner, and a width of the arc reflective surface 3*d* may change with the height. Furthermore, although the arc reflective surface 3*d* of the arc reflector 3 is formed as a twisted spiral surface in this embodiment, it may be formed as a spiral surface without twist.

In addition, in this embodiment, description was given for the case where the two light sources are arranged in the circumferential direction CC and two illumination optical systems each constituted by the reflective light collector 2, the first reflective surfaces 3*c* and 3*d*, the second reflective surfaces 3*a*, the prism panel 4 and the light diffusing panel 5 are configured for the two light sources 1. However, the number of the light sources and the number of the illumination optical systems are not limited to two, and may be one or plural more than three.

Moreover, the arc reflectors 3, the prism panels 4 and the light diffusing panels 5 do not need to be provided so as to match the number of the light sources 1. They may be provided as one component regardless of the number of the light sources. Furthermore, the reflective light collector 2 and the arc reflector 3 may be integrally formed.

Embodiment 2

Next, an illumination apparatus 11 for micro photography which is Embodiment 2 of the present invention will be described with reference to FIG. 13. This embodiment is different from Embodiment 2 in that assist light emitters for focusing, which were mentioned in Embodiment 1, are arranged at places (two places) on a circle line along which light exit portions (14) where illumination light exits extend and in that the overall illumination optical systems and the illumination apparatus 111 are downsized. Specifically, a configuration of the light exit portions (14) is changed so as to have two arc shapes which sandwich arrangement areas of the assist light emitters 21 and 22 from that having a complete ring shape as described in Embodiment 1.

Figure 13:
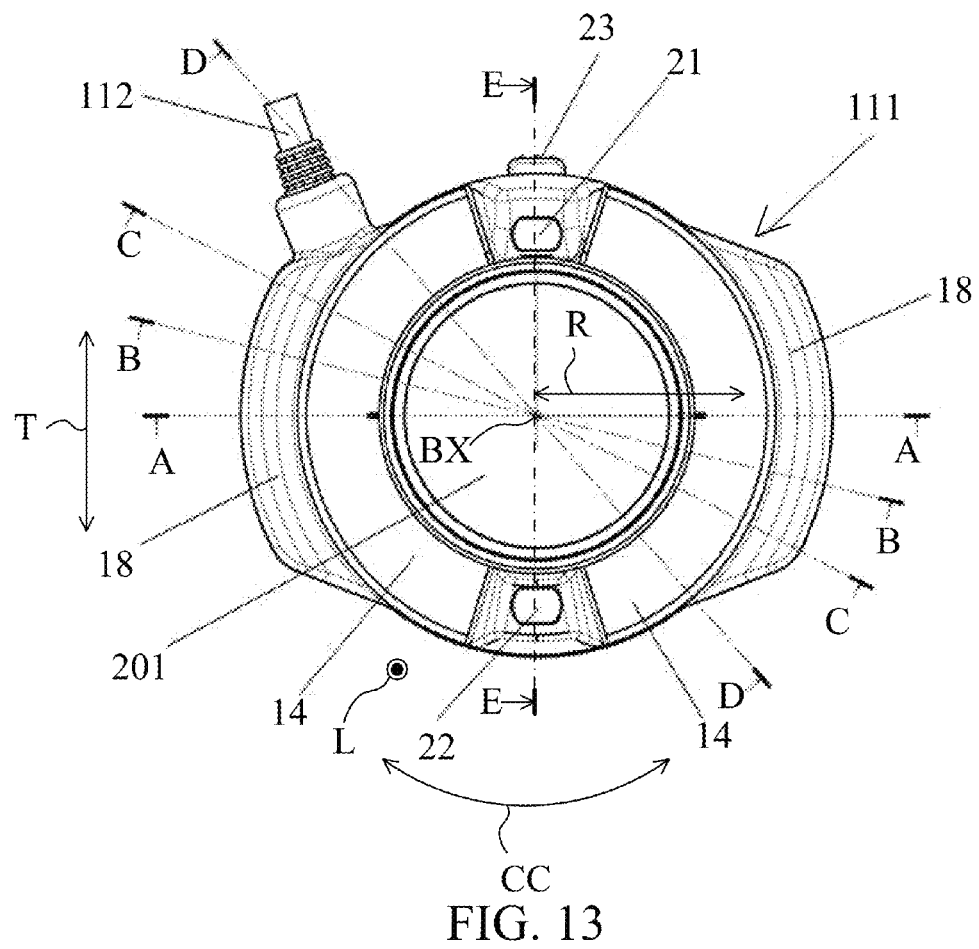
FIG. 13 is a front view of an illumination apparatus which is Embodiment 2 of the present invention.
Figure 14A:
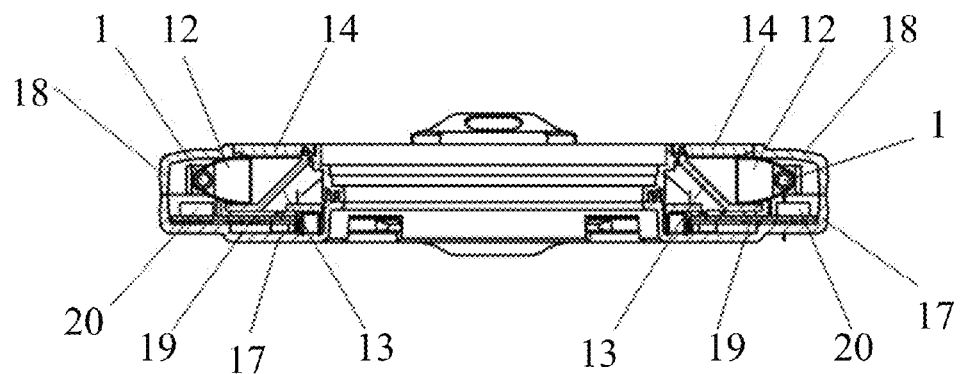
FIGS. 14A and 14B are a sectional view of the illumination apparatus of Embodiment 2 and a partially enlarged view thereof.
Figure 14B:
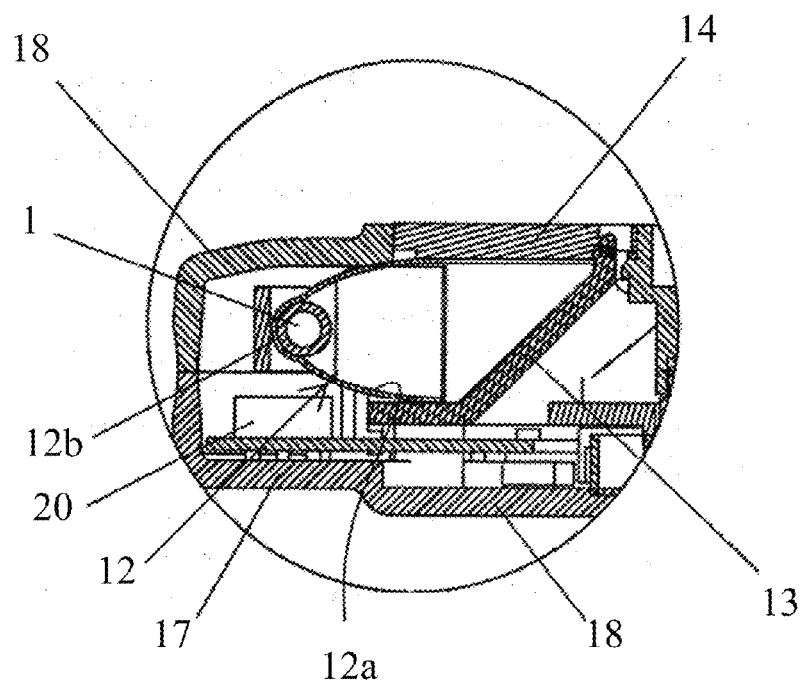
Figure 15A:
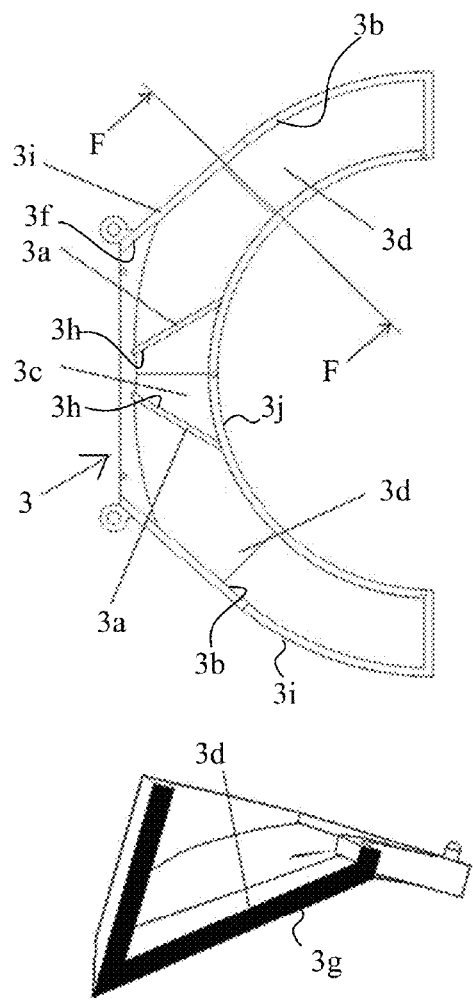
FIGS. 15A and 15B are comparison diagrams of Embodiments 1 and 2 (front views and sectional views of arc reflectors).
Figure 15B:
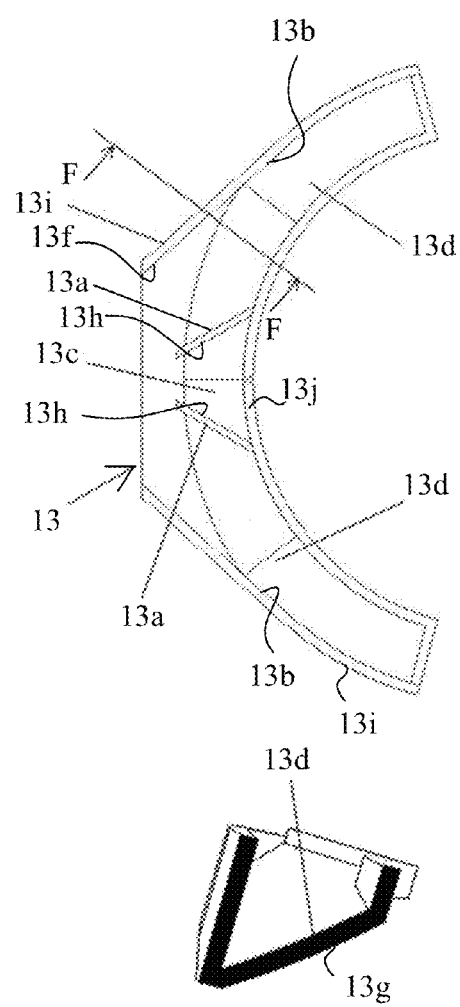
Figure 16A:
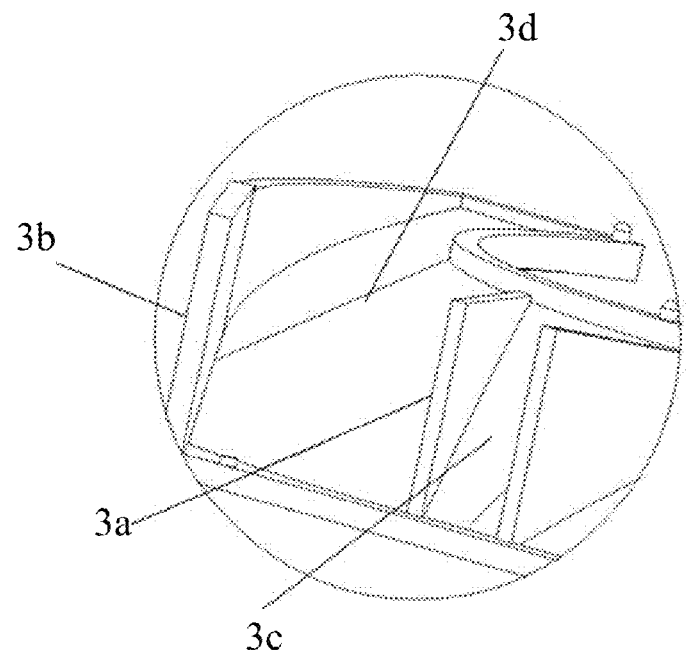
FIGS. 16A and 16B are comparison diagrams of Embodiments 1 and 2 (partially enlarged views of FIGS. 15A and 15B).
Figure 16B:
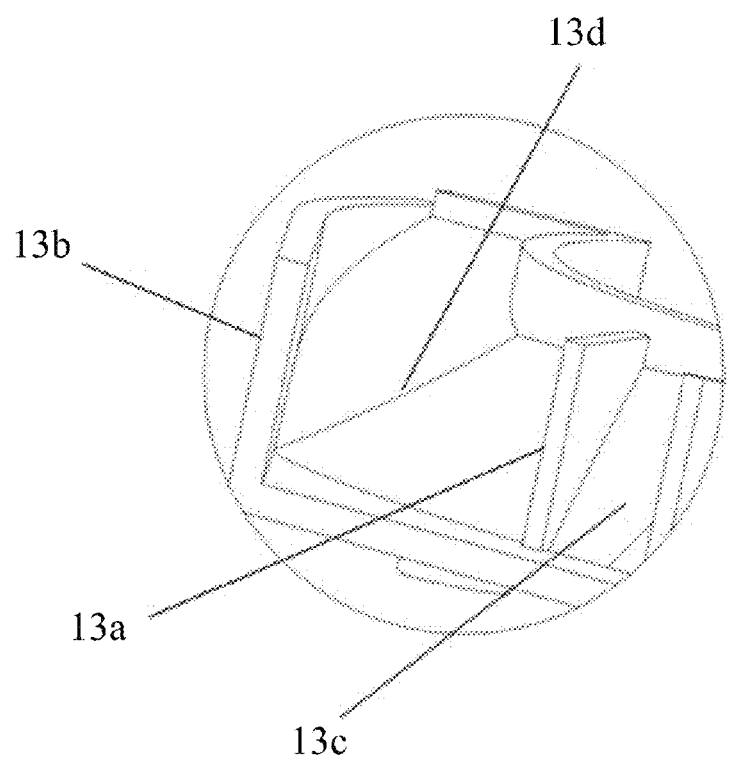
Figure 17A:
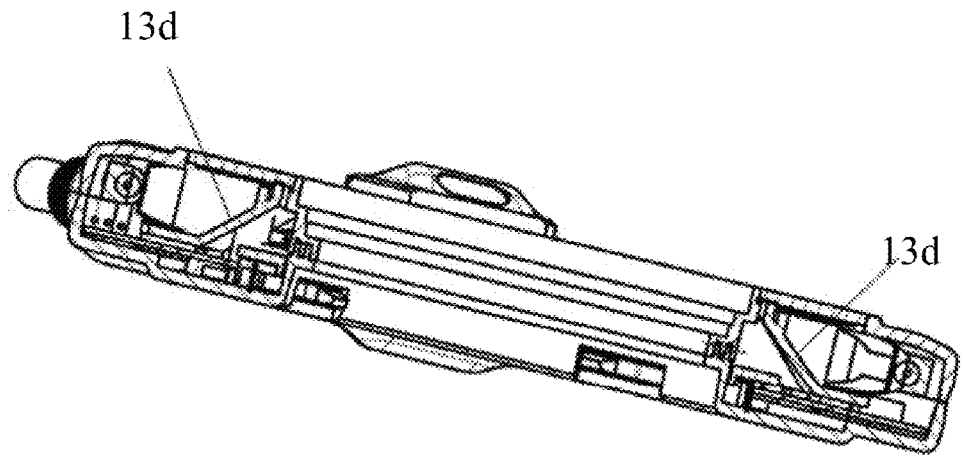
FIGS. 17A and 17B are comparison diagrams of Embodiments 1 and 2 (sectional views of the illumination apparatuses).
Figure 17B:
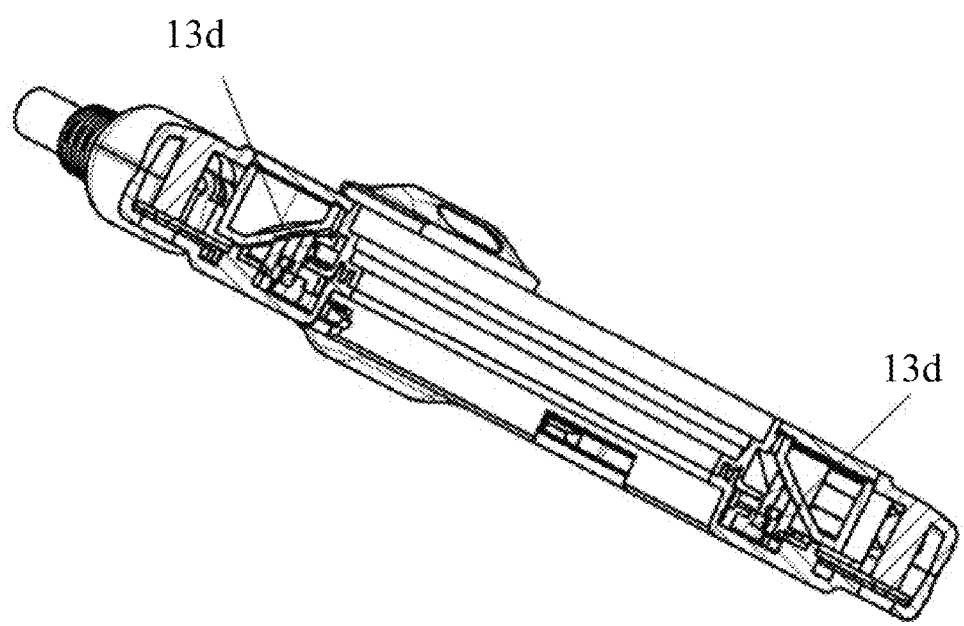
Figure 18A:
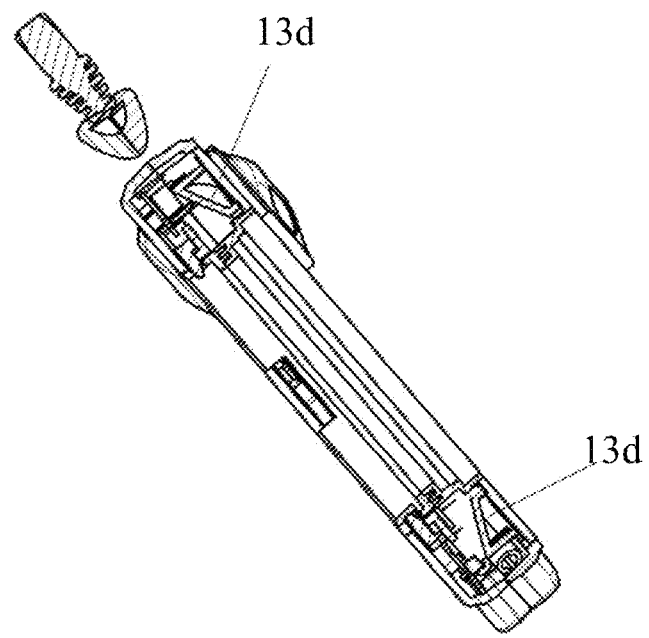
FIGS. 18A and 18B are sectional views showing an internal configuration of the illumination apparatus of Embodiment 2.
Figure 18B:
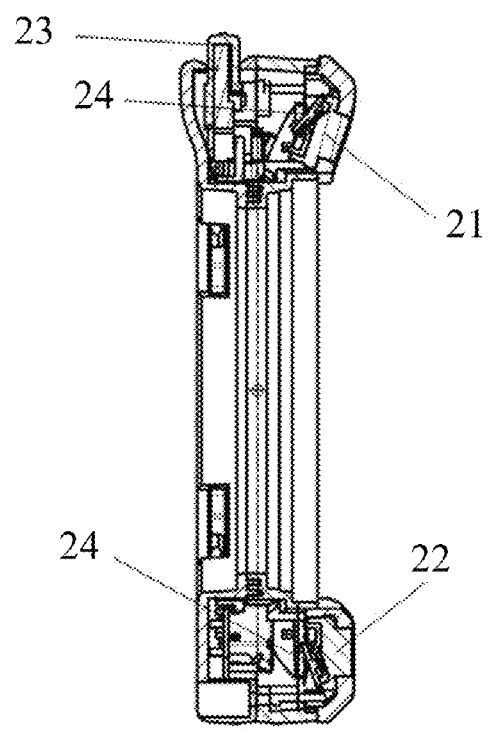
Figure 19:
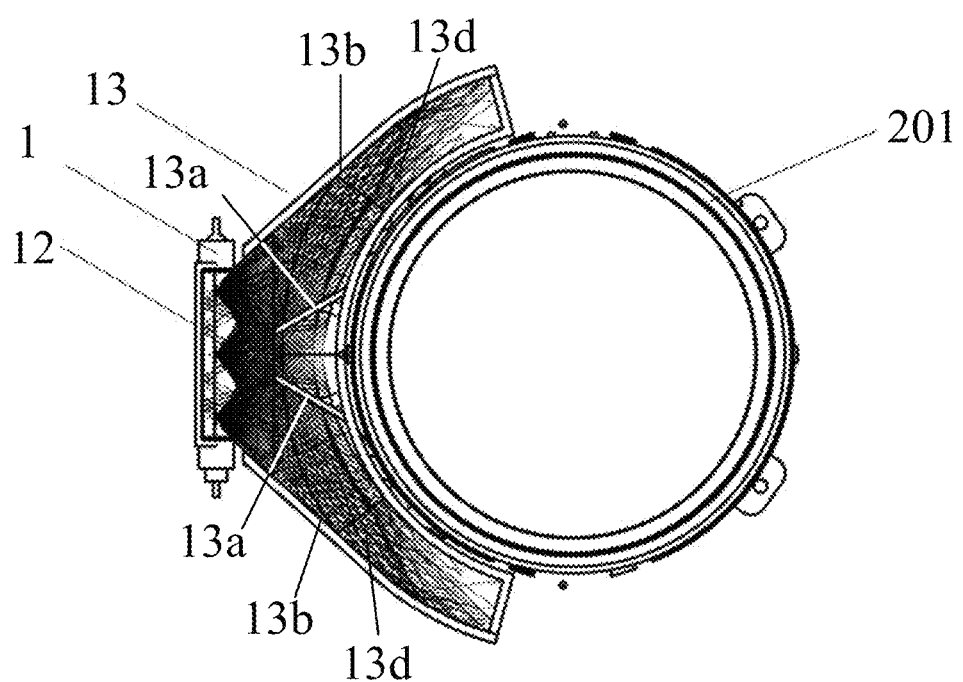
FIG. 19 is a ray tracing chart of the illumination apparatus of Embodiment 2.

FIGS. 14A and 14B show sectional views of the illumination apparatus 111 of this embodiment which are cut along an A-A line shown in FIG. 13. In an upper side of FIG. 15A, the arc reflector 3 in the illumination apparatus 101 described in Embodiment 1, which is viewed from its front side, is shown, and therebelow, an enlarged sectional view of the arc reflector 3 when cut along an E-E line in the above figure is shown. On the other hand, in an upper side of FIG. 15B, an arc reflector 13 in the illumination apparatus 111 which will be described in this embodiment, which is viewed from its front side, is shown, and therebelow an enlarged sectional view of the arc reflector 13 of this embodiment when cut along an F-F line in the above figure is shown. Moreover, FIG. 16A shows an enlarged view of part of the arc reflector 3 in Embodiment 1, and FIG. 16B shows an enlarged view of part of the arc reflector 13 in this embodiment. Furthermore, FIGS. 17A and 17B and FIGS. 18A and 18B respectively show sectional views when the illumination apparatus 111 of this embodiment is cut along B-B, C-C, D-D and E-E lines in FIG. 13. In addition, FIG. 19 is a ray tracing chart of the illumination apparatus of this embodiment.

As shown in FIG. 13, the illumination apparatus 111 of this embodiment is also detachably attached to the tip portion of the image capturing lens 201 so as to surround thereof. The illumination apparatus 111 includes a controller (not shown) which is connected by the connection cable 102 described in Embodiment 1. Also in this embodiment, as shown in FIG. 13, in a use state where the illumination apparatus 111 is attached to the image capturing lens 201, a direction toward an object field to be captured through the image capturing lens 201 is referred to as "a light projecting direction L" or "a front side" of the illumination apparatus 111. A direction corresponding to the radial direction of the image capturing lens 201 is referred to as "a radial direction R" of the illumination apparatus 111, and a direction surrounding the outer circumference of the image capturing lens 201 is referred to as "a circumferential direction CC" of the illumination apparatus 111. A direction in which a tangent line to the outer circumference (circle) of the image capturing lens 201 extends is referred to as "a tangent direction T" to the circumferential direction CC. A direction along the optical axis AX of the image capturing lens 201 is referred to as "a thickness direction" of the illumination apparatus 111.

Since a configuration of the illumination optical system of the illumination apparatus 111 of this embodiment is basically the same as that of the illumination optical system of Embodiment 1, a detail description of the illumination optical system is omitted. Constituent elements of this embodiment identical to those of Embodiment 1 are denoted by reference numerals same as those in Embodiment 1, and their description is omitted. The illumination apparatus 111 of this embodiment also has a symmetric configuration with respect to a center plane (plane of symmetry) which includes a center axis (axis coinciding with the lens optical axis AX in the use state) BX of the illumination apparatus 111 and on both sides of which two light sources are arranged. Therefore, in the following, a configuration of one side (left side) of the symmetric configuration will be described mainly and the other side (right side) of the symmetric configuration will be described as needed.

Reference numeral 12 denotes a reflective light collector as a light collector. The reflective light collector 12 includes a reflective surface 12a which reflects, of light diverging from an entire outer circumference of a straight tubular light source 1, light proceeding to directions other than directions toward an arc reflector 13 and a prism panel 14 each described later. In this embodiment, the light source 1 and the reflective light collector 12 are arranged on each of both sides sandwiching the center axis BX.

Parts of reflective surface 12a of the reflective light collector 12 are provided on both sides of the light source 1 in the thickness direction and on both sides of the light source 1 in its longitudinal direction, reflect the light to proceed toward the arc reflector 13 and the prism panel 14 and cause the reflected light to exit from a light exit opening formed between edge portions of the reflective surface 12a. Furthermore, the reflective light collector 12 causes, of the light diverging from the light source 1, light directly proceeding toward the arc reflector 13 and the prism panel 14 to exit from the light exit opening without reflecting it.

The reflective light collector 12 of this embodiment includes, in order to reduce its size, a portion 12b having a half cylindrical shape (hereinafter referred to as "a half cylindrical portion"), which is different from the reflective light collector 2 of Embodiment 1; the half cylindrical portion 12b has a reflective surface along a half cylindrical surface of the outer circumference of the light source 1 on an opposite side to the light exit opening. Thereby, the light emitted from the light source 1 toward the half cylindrical portion 12b is reflected by the half cylindrical portion 12b to be returned to the light source 1 again, and thereafter the returning light proceeds toward the light exit opening. The reflective surface 12a on a light exit opening side further than the cylindrical portion 12b has, in a sectional plane orthogonal to the longitudinal direction of the light source 1 (that is, the tangent direction T), a quadratic curve shape such as an elliptical shape. In the case of having an elliptical shape, similarly to the Embodiment 1, it is desirable to dispose one of two focal points thereof at a radial center of the light source 1 and dispose the other one of the focal points on a first reflective surface (described later) of the arc reflector 13, that is, on a first reflective surface side. The reflective light collector 12 can be manufactured by the same method described in Embodiment 1.

Reference numeral 13 denotes the arc reflector. The arc reflector 13 is provided for, similarly to the arc reflector 3 of Embodiment 1, each of the two light sources 1 (that is, two arc reflectors are provided in total). As shown in FIG. 15B in detail, the arc reflector 13 includes first reflective surfaces 13c and 13d which are formed inside further than the light source 1 in the radial direction R so as to extend in the circumferential direction CC and which reflect the light from the light source 1 (including the light reflected by the reflective light collector 12) in the light projecting direction L. Of the first reflective surfaces 13c and 13d, the first reflective surface 13c is a light source side reflective surface (first area) which is a portion facing a longitudinal central portion of the light source 1. Moreover, of the first reflective surfaces 13c and 13d, the first reflective surface 13d includes two arc reflective surfaces (second areas) formed so as to extend in an arc shape toward both sides from the light source side reflective surface 13c in the circumferential direction CC, that is, so as to extend away from the light source 1 in the circumferential direction CC. An optical path area (space) is formed between the light source side and arc reflective surfaces 13c and 13d and the prism panel 14 disposed further forward in the light projecting direction L than the reflective surfaces 13c and 13d.

In this embodiment, the assist light emitters 21 and 22 are arranged between the two arc reflective surfaces 13d of the arc reflector 13 respectively provided for the two light sources 1 (at two places sandwiching the center axis BX). Therefore, a length of the arc reflective surface 13d in the circumferential direction CC is shorter than that of the arc reflector 3 in Embodiment 1. Moreover, a width of the arc reflective surface 13d (that is, a width of the light exit portion) in the radial direction is also narrower than that of the arc reflector 3 in Embodiment 1. This is not only to reduce its size but also to prevent, when the light exit portion is formed in an arc shape, unevenness in light amount between on an outer circumferential side and on an inner circumferential side which is likely to occur due to concentration of light on the outer circumferential side which causes reduction of light proceeding to the inner circumferential side.

The arc reflector 13 in this embodiment also includes two second reflective surfaces 13a, similarly to the arc reflector 3 in the embodiment 1. As shown in FIG. 19, the second reflective surfaces 13a reflect part of the light that proceeds toward the light source side reflective surface 13c from the light source 1, toward the optical path area extending in a direction away from the light source 1 in the circumferential direction CC along each of the arc reflective surfaces 13d. The role and arrangement of the two second reflective surfaces 13a are the same as those described in Embodiment 1.

In this embodiment, since the reflective light collector 12 is smaller in size than the reflective light collector 2 in Embodiment 1, the two focal points of the reflective surfaces 12a are closer to each other as compared with those in Embodiment 1. Therefore, the entire optical path length can be shortened as compared with that in Embodiment 1. Furthermore, as compared in FIGS. 15A and 15B, in this embodiment, a width of the arc reflector 13 in the radial direction R can be made narrower than that of the arc reflector 3 in Embodiment 1 with the reduction in size of the reflective light collector 12. Therefore, in this embodiment, volume of the illumination optical system can be smaller in size than that in Embodiment 1. As a result, the entire illumination apparatus 111 can be downsized.

Reference numeral 14 denotes the prism panel (first optical member). The prism panel 14 is disposed at the light exit portion formed further forward in the light projecting direction L than the arc reflector 13. The prism panel 14 is manufactured to have a half arc shape with an opalescent optical material having a light diffusion property to diffuse light. In the illumination apparatus 111, two prism panels 14 are used.

Also in this embodiment, as in Embodiment 1, the light emitted from the light source 1 is divided into four types of light rays proceeding in mutually different optical paths in a sectional plane orthogonal to the longitudinal direction of the light source 1. Moreover, in an entrance surface of the prism panel 14 in this embodiment, a prism array constituted of multiple minute prism portions are also formed as in Embodiment 1. The functions of the prism portions for the four types of light rays are the same as those described in Embodiment 1.

In this embodiment, since light transmitted through the prism panel 14 is diffused in the radial direction R by the light diffusion property of the prism panel 14, there is no need to use the light diffusing panel 5 used in Embodiment 1. Thereby, downsizing (reduction of thickness) of the illumination apparatus 111 can be downsized in its thickness direction (that is, can be made thinner).

Reference numeral 17 denotes a back cover which holds the above described components constituting the illumination optical system and a mount substrate described later. Reference numeral 18 denotes a front cover which covers the light source 1 and the reflective light collector 12 in the front side of the illumination apparatus 111 and which includes a circle shaped opening exposing the light exit portion where the two prism panels 14 are disposed. In an inner circumferential portion around the opening of the front cover 18, engagement portions to hold the prism panels are formed. The reflective light collector(s) 12 and the light source(s) 1 thereinside are covered with the front cover 18, so that they cannot be seen through the prism panels 14 from the front side of the illumination apparatus 111.

On the mount substrate 19, electronic components 20 such as a trigger coil to start light emission of the light source 1, a light-receiving sensor to monitor a light amount emitted from the light source 1 and others are mounted.

Each of the assist light emitters 21 and 22 includes an LED 24 which is a light source and a light collecting lens which is arranged in front of the LED 24. The light emitted from the LED 24 is collected by the light collecting lens and is projected toward an object. Reference numeral 23 denotes a lock release button which is operated for releasing a locked state of a lock mechanism provided in the illumination apparatus 111 for attachment of the illumination apparatus 11 to the image capturing lens.

Next, the shape and others of the arc reflector 13 will be described in detail with reference to FIGS. 15B and 16A. The arc reflector 13 includes an entrance opening 13f into which an outer surface of the reflective light collector 12 near the light exit opening is fit and an arc shaped bottom portion 13g on which the light source side and arc reflective surfaces 13c and 13d as the first reflective surfaces are formed by metal deposition. Similarly to Embodiment 1, the light source side reflective surface 13c is formed as part of a conical surface having a tilt angle of 45° with respect to a reference plane along the radial direction R in the above-mentioned central sectional plane passing through the longitudinal center of the light source 1.

Moreover, similarly to Embodiment 1, each of the arc reflective surfaces 13d is formed, basically, as a surface tilted with respect to the reference plane along the radial direction R so as to be located further forward in the light projecting direction L (that is, so as to increase its height in the light projecting direction L) as being located away from the light source 1 (and the reflective light collector 12) in the circumferential direction CC. Furthermore, also in this embodiment, similarly to Embodiment 1, as shown in FIGS. 14A, 17A, 17B and 18A which are sectional views respectively corresponding to A-A, B-B, C-C and D-D lines in FIG. 13, the arc reflective surface 13d is formed as a twisted spiral surface.

However, in this embodiment, as shown in the lower part of FIG. 15B and in FIG. 16B, the arc reflective surface 13d is formed as a curved surface in which its central part in the radial direction R (width direction) is concave toward the light exit portion (in the light projecting direction L) with respect to its both side parts. The lower part of FIG. 15A and FIG. 16A show the arc reflective surface 3d in Embodiment 1 for comparison; the arc reflective surface 3d is formed as a flat surface.

The reason for forming the arc reflective surface 13d in such a concave curved surface is as follows. In this embodiment, with the downsizing of the illumination optical system, the light source 1 is disposed closer to inner circumferential wall portions 13j of the arc reflector 13 than to the arc reflector 3 in Embodiment 1, which makes it difficult for the light from the light source 1 to reach a far area of the light exit portion which is far away from the light source 1 in the circumference direction CC. Therefore, the arc reflective surface 13d is formed as the curved surface concave in its width direction so as to enlarge a space through which the light passes and thereby make it easy for the light from the light source 1 to reach the far area of the light exit portion. This configuration makes it possible to provide a uniform light amount distribution in the entire light exit portion.

The arc reflective surface 13d does not need to be formed as the curve surface whose central part in the width direction is most concaved, that, is, the most concaved part may shift to one side in the width direction. Moreover, a shape of the arc reflective surface 13d in its width direction may change along the circumference direction CC.

The arc reflector 13 further includes two partition walls 13h on which the two second reflective surfaces 3a, which are disposed between the light source side reflective surface 13c and the two arc reflective surfaces 13d, are formed by metal deposition.

The arc reflector 13 further includes outer circumferential wall portions 13i which respectively extend along outer circumferences of the two arc reflective surfaces 13d and whose inner circumferential surfaces are formed as outer circumferential reflective surfaces 13b by metal deposition. As can be seen in FIG. 19, part of the light that is reflected by the second reflective surfaces 13a proceeds to the optical path area along the arc reflective surfaces 13d after being reflected by the outer circumferential reflective surfaces 13b. In addition, there is also light reaching the outer circumferential reflective surfaces 13b directly from the light source 1 or the reflective light collector 12 to be reflected thereby. The outer circumferential reflective surfaces 13b can cause such light to reach areas of the prism panel 14 further away in the circumferential direction CC from the light source 1.

The inner circumferential wall portion 13j extends along inner circumferences of the light source side reflective surface 13c and the two arc reflective surfaces 13d. Also on an inner surface of the inner circumferential wall portion 13j, a reflective surface is formed by metal deposition. In this embodiment, in the radial direction R, a width of the prism panel 14 is larger than that of the light exit portion which is an arc shaped opening formed between the inner circumferential wall portion 13j and the outer circumferential wall portion 13i. However, the width of the light exit portion in the radial direction R and that of the prism panel 14 may correspond to each other.

Also in this embodiment, part of the outer circumferential wall portion 13i near the light exit opening of the reflective light collector 12, that is, part thereof from the light source 1 to the arc reflective surface 13d extends in the tangent direction of the arc shaped outer circumference of the prism panel 14. Thereby, the light from the light source 1 can be used efficiently without being blocked.

As described above, in this embodiment, as well as in Embodiment 1, the reflection of the light from the light source 1 by the first reflective surfaces 13c and 13d of the arc reflector 13 enables forming the light exit portion extending to the circumferential direction, without using a curved-tubular light source. Furthermore, guiding part of the light from the light source 1 to the circumferential direction CC by the second reflective surfaces 13a of the arc reflector 13 enables the light from the light source 1 to uniformly exit from the light exit portion. Thereby, an illumination apparatus can be achieved which is capable of efficiently utilizing the light from the light source 1 and performing uniform illumination suitable for micro photography.

In the illumination apparatus 111 of this embodiment, the reflective light collector 12 has the half cylindrical portion 12b formed along the outer circumferential surface of the light source 1 and a short focal length of the elliptic shape, which achieves further downsizing of the reflective light collector 12 in the radial direction R as compared with the illumination apparatus of Embodiment 1. Moreover, the arc reflector 13 has a narrower width in the radial direction R to reduce a distance between the center axis BX and the light source 1 (that is, to shift the light source 1 closer to the lens optical) as compared with Embodiment 1, which also achieves downsizing of the illumination apparatus 111 in the radial direction R.

Furthermore, in this embodiment, efficient arrangement of the light exit portion where illumination light from the light source 1 exits and the assist light emitters 21 and 22 on the same circle line achieves downsizing of the illumination optical system and the illumination apparatus 111. With such downsizing of the illumination optical system, a new space can be formed at the back of the illumination optical system in the illumination apparatus 111. In this embodiment, the mount substrate 19 on which the electronic components 20 are mounted is arranged in this back space. That is, arranging the mount substrate 19, which is similar to the mount substrate 9 which is arranged above (outside in the radial direction R further than) the light exit portion in the Embodiment 1, in the back space eliminate a large protrusion above the light exit portion which exists in Embodiment 1 to achieve the downsizing of the illumination apparatus 111.

According to each of the above embodiments, the reflection of the light from the light source 1 by the first reflective surface enables forming the light exit portion extending to the circumferential direction, without using a curved-tubular light source. Furthermore, guiding part of the light from the light source 1 to the circumferential direction CC by the second reflective surface enables the light from the light source 1 to uniformly exit from the light exit portion. Thereby, an illumination apparatus can be achieved which is capable of efficiently utilizing the light from the light source 1 and performing uniform illumination suitable for micro photography.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-012044, filed Jan. 25, 2013, which is hereby incorporated by reference herein in its entirety.

What is claimed is:

1. An illumination apparatus, which is arrangeable so as to surround an image capturing lens, the apparatus comprising, when, in a state where the illumination apparatus is arranged so as to surround the image capturing lens, a direction corresponding to a radial direction of the image capturing lens is defined as a radial direction of the illumination apparatus, a direction surrounding the image capturing lens is defined as a circumferential direction of the illumination apparatus, and a direction toward an object field to be captured through the image capturing lens is defined as a light projecting direction of the illumination apparatus:

a light source;
  a first reflective portion provided inside further than the light source in the radial direction so as to extend in the circumferential direction and reflecting light from the light source toward the light projecting direction, wherein the first reflective portion includes (1) a first area and (2) a second area extending in the circumferential direction from the first area to one circumferential side and to another circumferential side;

a second reflective portion provided inside further than the light source in the radial direction so as to extend in the radial direction and reflecting the light from the light source toward an area extending to a side away from the light source in the circumferential direction, wherein the second reflective portion includes (a) a first surface that reflects part of light from the light source toward part of the second area extending to the one circumferential side and (b) a second surface that reflects another part of the light to another part of the second area extending to the other circumferential side; and a third reflective portion provided between the first surface and the second surface in the circumferential direction and reflecting light from the light source toward the light projection direction.

2. An illumination apparatus according to claim 1, wherein the light source has a straight tubular shape or a linear shape whose longitudinal direction is a tangent direction to the circumferential direction.

3. An illumination apparatus according to claim 1, wherein the first reflective portion is tilted with respect to a plane along the radial direction so as to be located further forward in the light projection direction as being located further away from the light source in the circumferential direction.

4. An illumination apparatus according to claim 1, wherein the first reflective portion is formed so that its inner side part and its outer side part in the radial direction are located at different positions from each other in the light projection direction.

5. An illumination apparatus according to claim 1, wherein the first reflective portion is formed in the radial direction to have a curved surface shape concave toward the light projection direction.

6. An illumination apparatus according to claim 1, wherein the first and second surfaces have a shorter distance therebetween as being located further outside in the radial direction.

7. An illumination apparatus according to claim 1, wherein multiple light sources each as the light source are arranged in the circumferential direction, multiple first reflective portions each as the first reflective portion are provided corresponding to the respective light sources, and multiple second reflective portions each as the second reflective portion are provided corresponding to the respective first reflective portions.

8. An illumination apparatus according to claim 1, further comprising:

a light collector configured to direct light, which diverges from the light source, inward further than the light source in the radial direction by using a reflective surface, wherein the light collector is provided with a reflective surface whose sectional shape is an ellipse having two focal points on a light source side and a first reflective portion side.

9. An illumination apparatus according to claim 1, further comprising:

a prism portion arranged forward in the light projecting direction further than the first reflective portion, wherein the prism portion transmits, of the light from the light source, light reaching the prism portion after being reflected by the first reflective portion to the light projecting direction and reflects light thereof reaching the prism portion without being reflected by the first reflective portion to the light projecting direction.

10. An illumination apparatus according to claim 9, wherein the light source has a straight tubular shape or a linear shape whose longitudinal direction is a tangent direction to the circumferential direction, and wherein the prism portion is formed extending along the longitudinal direction of the light source.

11. An illumination apparatus according to claim 1, further comprising:

a light diffuser arranged forward in the light projecting direction further than the first reflective portion, wherein the light diffuser is configured to diffuse light proceeding to the light projection direction.

12. An illumination apparatus according to claim 11, wherein the light diffuser is formed by multiple cylindrical lenses each extending in the circumferential direction.

13. An illumination apparatus according to claim 1, wherein the illumination apparatus is attachable to and detachable from the image capturing lens and is supported by attachment to the image capturing lens so as to surround the image capturing lens.

14. An illumination apparatus according to claim 1, wherein reflective surfaces of the first and second reflective portions are not parallel to each other.

15. An illumination apparatus according to claim 1, wherein a reflective surface of the second reflective portion is orthogonal to a plane along the radial direction.

16. An illumination apparatus comprising:

a first reflective portion formed to have an arc shape, wherein the first reflective portion includes (1) a first area and (2) a second area extending in a circumferential direction from the first area to one circumferential side and to another circumferential side of the first reflective portion;

a light source arranged outside further than the first reflective portion in a radial direction of the first reflective portion;

a second reflective portion reflecting light from the light source to a side away from the light source in the circumferential direction of the first reflective portion, wherein the second reflective portion includes (a) a first surface that reflects part of light from the light source toward part of the second area extending to the one circumferential side and (b) a second surface that reflects another part of the light to another part of the second area extending to the other circumferential side;

an exit portion where the light reflected by the first reflective portion exits; and a third reflective portion provided between the first surface and the second surface in the circumferential direction and reflecting light from the light source toward the exit portion, wherein the first reflective portion reflects the light from the light source and the light from the second reflective portion toward the exit portion.

17. An illumination apparatus according to claim 16, wherein the exit portion is formed in an arc shape.

18. An illumination apparatus according to claim 16, wherein a reflective surface of the second reflective portion is orthogonal to the exit portion.

19. An illumination apparatus according to claim 16, wherein the light source has a straight tubular shape or a linear shape whose longitudinal direction is a tangent direction to the circumferential direction.

* * * * *